(12) United States Patent
Higurashi et al.

(10) Patent No.: US 7,239,703 B2
(45) Date of Patent: Jul. 3, 2007

(54) COPYRIGHT PROTECTION SYSTEM FOR DATA STORAGE AND TRANSMISSION

(75) Inventors: Seiji Higurashi, Tokyo (JP); Takayuki Sugahara, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 10/917,489

(22) Filed: Aug. 13, 2004

(65) Prior Publication Data

US 2005/0078937 A1 Apr. 14, 2005

Related U.S. Application Data

(62) Division of application No. 09/513,693, filed on Feb. 25, 2000, now Pat. No. 6,834,349.

(30) Foreign Application Priority Data

Feb. 26, 1999 (JP) .................................... 11-51732
Apr. 8, 1999 (JP) .................................. 11-101178

(51) Int. Cl.
*H04N 7/167* (2006.01)
(52) U.S. Cl. ..................... 380/203; 380/201; 380/239; 369/47.1; 369/47.12; 705/57; 725/31; 726/31
(58) Field of Classification Search ............... 380/201, 380/203, 239, 37, 240, 31; 705/57; 369/47.1, 369/47.12; 726/26, 30, 31; 725/31
See application file for complete search history.

(56) References Cited

U.S. PATENT DOCUMENTS 6,289,102 B1 9/2001 Ueda et al.
6,301,663 B1 10/2001 Kato et al.
6,330,672 B1 12/2001 Shur (Continued)

FOREIGN PATENT DOCUMENTS

EP 0696798 A1 2/1996

(Continued)

OTHER PUBLICATIONS

Partial European Search Report, EP00103976, Sep. 23, 2002, pp. 1-5.

(Continued)

*Primary Examiner*—Emmanuel L. Moise
*Assistant Examiner*—Paul Callahan
(74) *Attorney, Agent, or Firm*—Connolly Bove Lodge & Hutz LLP

(57) ABSTRACT

The invention provides a recording media player and a recording media recorder provided with a high-security copy protection system of less complexity. A recording media player and/or recorder provided with a copy protection system stubborn to attacks and highly flexible in dealing with recording media of various copy conditions. For this purpose, various distributed copyright protection information (DCPI) values are used. The DCPI values include water marks in case of an MPEG stream, Copy Generation Management System (CGMS) codes, EMI (encryption mode indicator) in case of an IEEE1394-1995 interface, and user defined DCPI values. The recording is achieved such that DCPI values are recorded in user-unrewritable (or user-inaccessible) areas of the recording medium as long as possible.

5 Claims, 20 Drawing Sheets

U.S. PATENT DOCUMENTS

| | | |
|---|---|---|
| 6,523,113 B1 | 2/2003 | Wehrenberg |
| 6,526,220 B2 * | 2/2003 | Oguro et al. ................. 386/94 |
| 6,556,679 B1 | 4/2003 | Kato et al. |
| 6,748,485 B1 * | 6/2004 | Yokota et al. .............. 711/112 |
| 6,782,190 B1 * | 8/2004 | Morito ........................ 386/94 |

FOREIGN PATENT DOCUMENTS

| | | |
|---|---|---|
| EP | 0762758 A2 | 3/1997 |
| EP | 0860823 A1 | 8/1998 |
| EP | 0903736 A2 | 3/1999 |
| JP | 61-201586 | 9/1986 |
| JP | 63-107281 | 5/1988 |
| JP | 9-83936 | 3/1997 |
| WO | WO 97/33283 | 9/1997 |

OTHER PUBLICATIONS

European Search Report, EP00103976, Dec. 12, 2002, pp. 1-6.

\* cited by examiner

| CGMS | OF | COPY CONTROL |
|------|-----|--------------|
| 00 | ○ | COPYABLE |
| 01 | × | UNDEFINED |
| 10 | ○ | ONE-TIME COPYABLE |
| 11 | 1 | COPY-PROHIBITED |

×: DON'T CARE

*FIG. 6*

| SB # | CONTENTS | | |
|------|----------|---|---|
| 6n | PCO (PACK HEADER) | 34-1 | |
| 6n+1 | PC1 | 34-2 | |
| 6n+2 | PC2 | 34-3 | FOR 6 SYNC BLOCKS |
| 6n+3 | PC3 | 34-4 | |
| 6n+4 | PC4 | 34-5 | |
| 6n+5 | PC5 | 34-6 | |

PCO= FFH
PC1 ~ PC5= V2

*FIG. 7*

| PMF | STATE OF RECORDING MEDIUM | PLAY | SW 230 |
|---|---|---|---|
| 00 | COPYABLE | ○ | ON |
| 01 | ONE-GENERATION COPYABLE | ○ | ON |
| 10 | COPY-PROTECTED (PLAY ONLY) | ○ | OFF |
| 11 | PIRATED | × | OFF |

*FIG. 9*

COPYRIGHT PROTECTION SYSTEM FOR DATA STORAGE AND TRANSMISSION

This application is a divisional application of Ser. No. 09/513,693, filed Feb. 25, 2000, now U.S. Pat. No. 6,834,349. The contents of said application are incorporated herein.

BACKGROUND OF THE INVENTION

1. Field of the Invention

The invention generally relates to a digital audio or video player or recorder and, more specifically, to a method of and a system for protecting the copyright of a program recorded on a storage medium such as a video tape, an optical disc, semiconductor memory, etc. in such a player or a recorder.

2. Description of the Prior Art

A variety of copy protecting schemes for various recording media have been proposed so far. In Digital Audio Tape (DAT) recorders for-example, the Serial Copy Management System is used in which copy operation is controlled such that an-original DAT tape is permitted to be copied only once.

As one of such copy protecting schemes, there is also known the Copy Generation Management System (CGMS) that uses two-bit copy generation management signals or flags. In this system, if the value of the two-bit signals recorded on a recording medium is "00", then the copying of the recording medium is permitted unlimitedly; if "10", then the copying is permitted only once; and if "11", then the copying is prohibited. In the above-mentioned case of "10" in the two-bit signals, the copying involves a change of the value of the two-bit signals from "10" to "11".

In one copy protection scheme used in video recorders that stores, on a recording medium, a transport stream (TS) based on the MPEG-2 (Moving Picture Experts Group phase 2) standard, a digital water mark is embedded in the transport stream in recording operation. The water mark is detected in playing operation to determine whether the recording medium should be played.

However, if a recorded recording medium is copied by using a player and a recorder, then any of the above mentioned authentication signals, i.e., the Serial Copy Management signal, the two-bit copy generation management signals and the digital water mark will be transferred from the player to the recorder. This gives an attacker a chance to counterfeit such the transferred authentication signal(s) such that the counterfeited authentication signal(s) has a value indicative of permission to copy the recording medium, permitting the attacker to make copies of the recording medium.

One solution to this problem was given by U.S. Pat. No. 5,659,613, which discloses "Method and apparatus for copy protection for various recording media using a video finger print". The method and apparatus use a combination of a Video Finger Print Signal and an Authenticating Signature to permit the player to handle either copy-protected or non-copy-protected media, in a manner that is difficult to compromise. The patent is hereby incorporated by reference.

However, it is preferable for the recording media player and/or recorder to have a higher copy protection capability. Though the higher the better, if the system becomes the more complicated, it won't be desirable. It is also preferable for the recording media player and/or recorder to have a high degree of flexibility in dealing with recording media of various copy conditions such as a freely copy-able type, a one-generation copyable type (or a type having a one-time copy permission and having not been copied), a play-only type, and a pirated and even-play-prohibited type.

It is therefore an object of the invention to provide a recording media player and a recording media recorder provided with a high-security copy protection system of less complexity.

It is another object of the invention to provide a recording media player and a recording media recorder provided with a copy protection system stubborn to attacks and highly flexible in dealing with recording media of various copy conditions.

SUMMARY OF THE INVENTION

The above problems are overcome by a method of and an apparatus for recording a digital data stream on a recording medium in a recording format. The data stream includes a first protection level value indicative of a protection level of the program. The recording format comprises the cycle of a user area for containing data to be recorded and a system area for containing data necessary for the format. The system area includes an area whose data can not be rewritten by a second user (hereinafter, referred to as "user-unrewritable area"). The method and apparatus comprise the steps of and means for (a) recording the data stream on the recording medium by filling one user area after another, the data stream including a program of contents data, (b) recording a second protection level value indicative of the protection level assigned to the program in a first field of the user-unrewritable area, (c) recording a flag indicative of whether a source of the data stream is original or not in the first field, (d) generating a first value arbitrarily, (e) recording the first value in a second field of the user-unrewritable area, and (f) recording a second value given as a function of the first value in a third field of the user-unrewritable area.

According to an aspect of the invention, a prerecorded recording medium having a recording format comprising a cycle of a user area for containing data to be recorded and a system area for containing data necessary for the format is provided. The system area includes a user-unrewritable area whose data can not be rewritten by a user. The recording medium stores a sequence of digital data recorded in the user areas on the recording medium. The digital data sequence includes a program of content data in a predetermined format. A first protection level value indicative of a protection level of the program is embedded in the digital data sequence. A second protection level value indicative of the protection level assigned to the program is recorded in a first field of the user-unrewritable area. A flag indicating that the recording medium is original is also recorded in the first field. An arbitrarily generated first value is recorded in a second field of the user-unrewritable area. A second value given as a function of the first value is recorded in a third field of the user-unrewritable area.

According to another aspect of the invention, a method of and an apparatus including playing means for playing a recording medium already storing a sequence of digital data are provided. The sequence of digital data includes a program of compressed contents data in which a first protection level value indicative of a protection level of the program is embedded. The recording medium further stores, in at least one user-unrewritable area, a second protection level value indicative of the protection level assigned to the program, a flag indicative of whether the recording medium is original, an arbitrarily generated first value and a second value given as a function of the first value. The method or the playing means comprises the steps of or a plurality of means for (a)

extracting the compressed contents data in the digital data sequence; (b) selecting one of predetermined modes of operation according to a combination of the second protection level value and the flag; (c) changing the selected mode to a play-prohibited mode if the selected mode is a copy permitting mode and if the recording medium is determined to be pirated from the first protection level value; (d) changing the selected mode to the play-prohibited mode if the selected mode is a presentation mode in which only expanded contents data is output and if the function is not true to the first and second values; (e) expanding and decoding the contents data into an expanded decoded contents data; (f) converting the expanded decoded contents data into an analog contents data; (g) terminating the steps or means (a), (e) and (f) in case of the play-prohibited mode; (h) outputting the analog contents data in case of the a presentation mode; and (i) outputting the analog contents data and the compressed contents data in case of the copy permitting mode.

The data stream may be encrypted with a key assigned for the program into an encrypted data stream, which is recorded on the recording medium. In this case, the key is encrypted with a master key into an encrypted key for use as the first value, which is recorded in the second field of said user-unrewritable area. The second value given as the function of the encrypted key is recorded in the third field of the user-unrewritable area. In playback operation, the master key-encrypted key is used as the arbitrarily generated first value. The second value is a value given as the function of the master key-encrypted key. The master key-encrypted key is decrypted with a stored master key into a decrypted value. The sequence of key-encrypted digital data is decrypted with said decrypted value into the digital data sequence.

According to further aspect of the invention, a method of and an apparatus for recording an analog data stream on a recording medium in a recording format are provided. The recording format comprises a first cycle of a user area for containing data of the data stream and a system area for containing data necessary for the format. The system area includes a user-unrewritable area whose data can not be rewritten by a first user, the method and the apparatus comprise the steps of and means for: converting the analog data stream into a compressed digital data stream having a data format comprising a second cycle of a program data portion and a user data portion in which a second user is permitted to include user data, the entire program data portions in the data stream constituting a program of content data; generating a first value at random, the first value being other than zero; generating a sample value from the program data portion; calculating a second value by using a function of the first value, the sample value and a predetermined value; inserting a sync data indicative of an existence of the second value and the sample value, the second value and the sample value in the user data portion of the compressed digital data stream; recording the first value in the user-unrewritable area included in the system area; and recording the compressed digital data stream on the recording medium by filling one user area after another.

The just-described method or apparatus produces an inventive prerecorded recording medium having a recording format comprising a first cycle of a user area for containing data to be recorded and a system area for containing data necessary for the format. The system area includes a user-unrewritable area whose data can not be rewritten by a user. On the recording medium there is recorded a sequence of digital data recorded in the user areas on the recording medium, the digital data sequence including a program of content data in a predetermined format, the predetermined format comprising a second cycle of a program data portion and a user data portion in which a user is permitted to include user data. The recording medium further stores an arbitrarily generated first value in the user-unrewritable area; a sample value generated from the program data portion, the sample value being inserted in the user data portion; a second value calculated by using a function of the first value, the sample value and a predetermined value, the second value being inserted in the user data portion; and a sync data indicative of an existence of the second value and the sample value, the sync data being positioned before the sample value and the second value in the user data portion.

The just-described prerecorded recording medium can be played by an inventive method of or apparatus including playing means for playing a recording medium already storing a sequence of digital data including a program of compressed content data having a predetermined data format. The recording medium stores an arbitrarily generated first value in a user-unrewritable area. The recording medium further stores, in a predetermined area of the predetermined data format, a sample value generated from the program data portion, a second value calculated by using a function of the first value, the sample value and a predetermined value. The method or the apparatus including the playing means comprise the steps of or a plurality of means for: (a) extracting the compressed content data in the digital data sequence; (b) making a test to see if the function is true to the first value, the second value, the sample value and a stored value which equals the predetermined value; (c) outputting a decoded version of the compressed content data only if the test has passed.

According to still another aspect of the invention, a method of and an apparatus for decoding an input data stream having a digital interface format according to the IEEE1394 standard into an analog video signal is provided. The input data stream includes a first code indicative of a protection level of a source of the input data stream. The method or the apparatus comprises the steps of or a plurality of means for: converting an input data stream into an expanded decoded digital data stream in which a second code indicative of a protection level of a source of the input data stream is embedded; extracting the first and second codes; making a test based the first and second codes to see if the source invalid; and outputting an analog version of the expanded decode digital data stream as the analog video signal only if it is determined in the test that the source is valid.

BRIEF DESCRIPTION OF THE DRAWING

The features and advantages of the present invention will be apparent from the following description of an exemplary embodiment of the invention and the accompanying drawings, in which:

FIG. 6 is a table showing possible values of the CGMS and OF flags and corresponding copy control conditions;

FIG. 7 is a diagram showing the way of recording a 5-byte second value V2 of DCPI in DATA-AUX areas 34 of 6 successive sync blocks;

FIG. 9 is a table showing the relationship between the PMF value and the control of the switches 230 and 270;

Throughout the drawing, the same elements when shown in more than one figure are designated by the same reference numerals.

DETAILED DESCRIPTION OF THE PREFERRED EMBODIMENTS

Embodiment I

The invention is applicable to such recording media as have a user-rewritable area and an unrewritable (or user-inaccessible) area. Such recording media include video tapes, video cassettes, various optical discs, hard discs, semiconductor memory system comprising a RAM (random access memory) area and a ROM (read only memory) area, etc as detailed later. However, this specific embodiment is described taking a D-VHS (data video home system, D-VHS is a registered trade mark) video cassette recorder (VCR) as an example.

Figure 1:
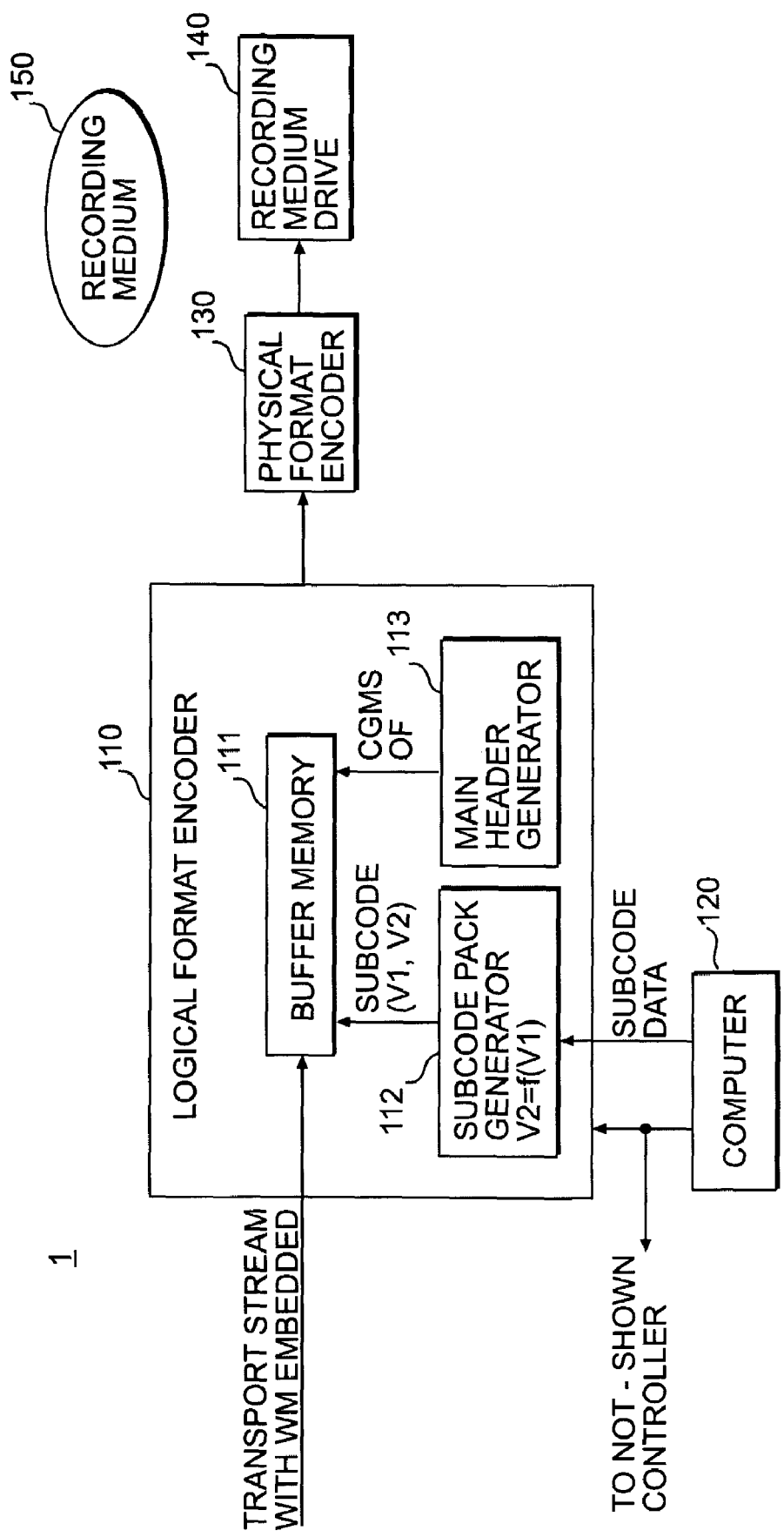
FIG. 1 is a schematic block diagram showing an exemplary arrangement of a VCR according to a first illustrative embodiment of the invention.

FIG. 1 is a schematic block diagram showing an exemplary arrangement of a VCR according to a first illustrative embodiment of the invention. In FIG. 1 the VCR 1 comprises a logical format encoder 110 having a transport stream input terminal; a computer 120 which supplies subcode data (detailed later) to the logical format encoder 110; a physical format encoder 130 connected to a logical format encoder 110 output, and a recording medium drive 140 connected to a physical format encoder 130 output. The logical format encoder 110 includes a buffer memory 111, a subcode pack generator 12 and a main herder generator 13. The computer 120 also supplies various information to the logical format encoder 110 and a controller (not shown) for controlling the elements 110, 130 and 140.

It is assumed that a transport stream (TS) according to the MPEG-2 standard is input to the input terminal of the encoder 110. The transport stream consists of 188-byte packets. It is also assumed that a digital water mark (WM) is imbedded in the TS in a well-known manner. The digital water mark contains two bit flags which have the same values as the above mentioned CGMS flags and indicate a copy-permission class of the TS. Hereinafter, the two-bit flags are referred to as "the CGMS bits of a WM. Specifically, if the value of the WM flags (or CGMS flags) is "00", then the copying of the recording medium is permitted unlimitedly; if "10", then the copying is permitted only once; and if "11", then the copying is prohibited. The WM is removed by using an authenticated WM-removal component in a player.

In this embodiment, a single-bit original flag (OF) is also used to indicate whether a prerecorded recording medium is a legitimately prerecorded original medium or a pirated copy of an original medium. If a prerecorded recording medium is a copy-protected original medium, the medium has an original flag of "1", and WM flags and CGMS flags of "11".

The transport stream input to the logical format encoder 110 is converted into a digital signal in accordance with the D-VHS standard by using information from the subcode pack generator 112 and the main header generator 113 as detailed later. The digital signal from the logical format encoder 110 is physical format encoded into a signal suited for recording in a well-known manner in the encoder 130. The signal from the encoder 130 is recorded on the recording medium 150 (a video cassette in this example) by the recording medium drive 140. In this way, the formatted TS is recorded along tracks running obliquely with respective to the longitudinal direction of the cassette tape 150.

Figure 2:
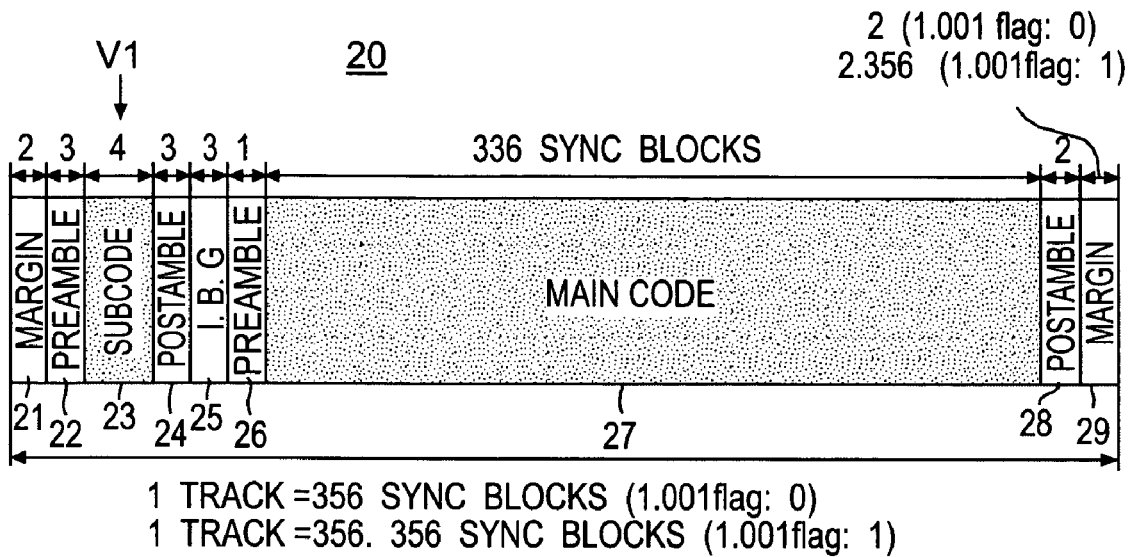
FIG. 2 is a diagram showing a format of each of the tracks recorded on the cassette tape 150.

FIG. 2 is a diagram showing a format of each of the tracks recorded on the cassette tape 150 according to the D-VHS standard. Each track 20 is a set of fixed length data blocks known as sync blocks (detailed later). Specifically, each track 20 comprises a margin 21 of 2 sync blocks; a subcode 23 of 4 sync blocks' worth in length (i.e., 4×4 subcode sync blocks of 28 bytes, which are detailed later); a main code area 27 of 336 sync blocks; and a margin 29. The subcode 23 is accompanied by a preamble 22 of 3 sync blocks and a postamble 24 of 3 sync blocks. The main code area 27 is also accompanied by a preamble 26 of one sync block and a postamble 28 of 2 sync blocks.

Since a rotor (not shown) with heads (not shown) mounted is so controlled as to rotate 30 rps or 29.97 rps according to a drum servomechanism in the recording medium drive 140, the length of margin 29 is 2 sync blocks if a 1.001 flag is 0 and 2.356 sync blocks if the 1.001 flag is 1. Thus, the total length of each track 20 is 356 sync blocks or 356.356 sync blocks. In either case, each of the 188-byte packets of the transport stream is recorded in two adjacent sync blocks in the main code area 27.

Figure 3:
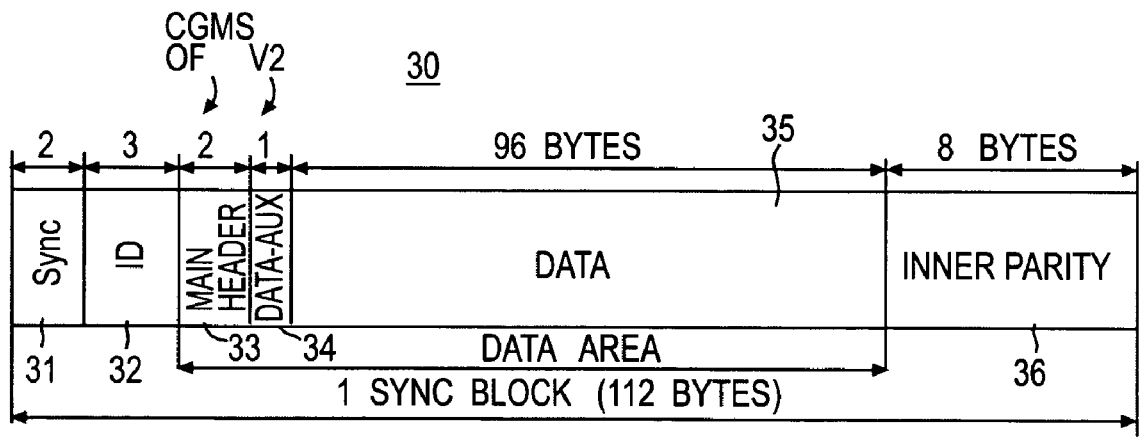
FIG. 3 is a diagram showing a format of each of the sync blocks used in the data area 27 of each track.

FIG. 3 is a diagram showing a format of each of the sync blocks used in the data area 27 of each track. Each sync block comprises a sync 31 signal of 2 bytes, an ID of 3 bytes, a main header 33 of 2 bytes, an auxiliary data area (DATA-AUX) 34 of one byte, a data field 35 of 96 bytes, and an 8-byte inner parity 36 for error correction. The 96-byte data field 35 contains user data, i.e., a half of a 188-byte TS packet. In this sense, the data field 35 is a user-rewritable area.

It is noted that the subcode area 23, the main header 33 and a DATA-AUX 34 are data areas, which are exclusively used by the system and can not be rewritten by the user. For this, the subcode area 23, the main header 33 and a DATA-AUX 34 are hereinafter referred to as the user-unrewritable areas. According to the principles of the invention, distributed copyright protection information is recorded in the user-unrewritable areas as detailed in the following. The distributed copyright protection information (hereinafter, referred to as "DCPI") preferably comprises the above-mentioned CGMS flags, the original (OF) flag, a first value V1 and a second value V2 which is given as the value of a function of the first value V1. That is, $$V2=f(V1), \qquad (1)$$

where $f(V1)$ is any suitable function of V1.

Figures 4, 5:
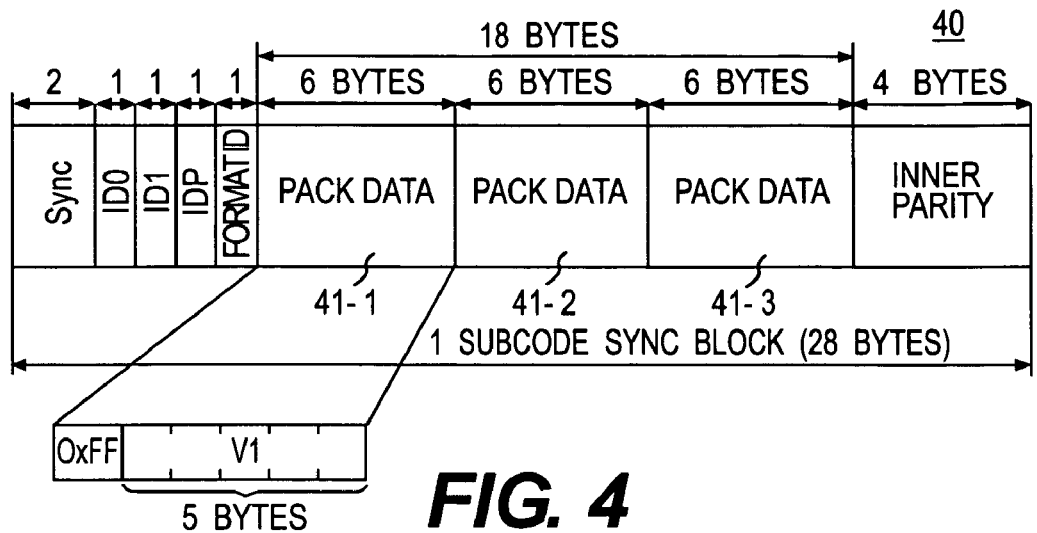
FIG. 4 is a diagram showing a format of each of the subcode sync blocks that constitute the subcode 4 in each track 20.
FIG. 5 is a diagram showing a combined format of 2-byte main headers 33 of 12 successive sync blocks 30 in the main code area 27 of each track 20.

FIG. 4 is a diagram showing a format of each of the subcode sync blocks that constitute the subcode 4 in each track 20. In FIG. 4, a subcode sync block 40 is 28 bytes in length and contains 3 pack data fields 41-1 through 41-3 of 6 bytes. A subcode 23, which is 4×112 bytes in length, comprises 16 subcode sync blocks 40. According to the principles of the invention, the above-mentioned first value V1 of DCPI (or the distributed copyright protection information) is preferably recorded in at least one pack data field 41 of at least one subcode sync block 40 in the subcode area 23 of each track 20. Specifically, in this specific embodiment, a single-byte code (0xFF) indicative of the first value V1 of DCPI is recorded in the first byte of the first pack data 41-1 of, for example, the first subcode sync block 40 in the subcode area 23. The first value V1 is recorded in the 5 bytes following the first byte of the first pack data 41-1. In this case, the length of the first value V1 is preferably set to 5 bytes. However, the length of the first value V1 may be set longer by using a plurality of pack data areas 41.

FIG. 5 is a diagram showing a combined format of 2-byte main headers 33 of 12 successive sync blocks 30 in the main code area 27 of each track 20. Since 12 successive sync blocks 30 constitute one sync block cycle, there are 28 sync block cycles in each main code area 27. In FIG. 5, a notation "SB#" indicates the sync block number in each sync block cycle. The higher 4 bits of the first byte of each main header 33 contains format information 42. A 12-byte area comprising the lower 4 bits of the first byte and the second byte in each main header 33 contains sync block information 43.

According to this specific embodiment of the invention, the CGMS flags 44 included in DCPI is recorded in the higher two bits of the main header 33 of the eleventh sync block 33 in each sync block cycle. The original flag (OF) 45 included in DCPI is recorded in the MSB (most significant bit) of the main header 33 of the last (or 12th) sync block in each sync block cycle. In this specific embodiment, the CGMS 44 is always set to logical "11" (meaning the copy prohibition) if the OF flag 45 is logical "1". The OF flag 45 is set to logical "0" if the CGMS 44 is either "00" or "10" (meaning the unlimited copy permission or the one-time copy permission) as shown in FIG. 6.

According to the principles of the invention, the above-mentioned second value V2 of DCPI (or the distributed copyright protection information) is recorded dispersedly in DATA-AUX fields 34 of plural sync blocks 30 in the main code area 27 of each track 20 as shown in FIG. 7. Since the first value V1 was assumed to be 5 bytes in length, the second value V2 is also assumed to be 5 bytes long. In FIG. 7, a single-byte start code of 0xFF is recorded in the DATA-AUX field (or DATA-AUX pack PC0) 34-1 in the first one of 6 successive sync blocks 30, and the second value V1 is recorded in the 5 DATA-AUX fields (or DATA-AUX packs PC1–PC5) 34-2 through 34-6 in the 5 remaining ones of the 6 successive sync blocks 30. That is, PC0=0xFF, and PC1 through PC5=1st to 5th bytes of V2, respectively.

The DCPI first value V1 may be set any suitable value. For example, the first value V1 may be a random number generated periodically, say, every video frame (i.e., every 29.97 seconds), or a hash total for a predetermined part of the main code 27. For the sake of the simplicity of the following description, the value V1 is assumed to be a 5-byte hexadecimal number. Also, the second value V2 is assumed to be given by the following expression, $$V2 = 0 \times FFFFFFFFFF - V1 \qquad (2)$$
$$= (0 \times 10^{10} - 1) - V1$$

where the prefix "0x" indicates that the following number is one expressed in the hexadecimal system. In other words, the values V1 and V2 are a 1's complement of each other. The DCPI first and second values V1 and V2 are recorded only when the OF flag is logical "1".

Returning now to FIG. 1, in recording mode or operation, the subcode pack generator 112 generates a DCPI first value V1 and subcode packs 34 containing a DCPI second value V2 corresponding to the value V1 if the OF flag is 1. However, if the OF flag is logical "0", then the subcode pack generator 112 generates an ordinary subcode pack in a usual manner. The main header generator 113 generates main headers 33 including one containing the CGMS flags 44 and one containing the OF flag 45. The logical format encoder 110 encodes the input TS packets into track formats as shown in FIGS. 2 through 7.

The above-described D-VHS VCR 1 is a VCR for a content provider to producing prerecorded video cassettes. Here, we assume that a user makes a copy of a prerecorded video cassettes recorded by the inventive VCR 1 by using two D-VHS VCR's, i.e., a first one for playing and the second one for recording. Then, the digital water marks are transferred to the copy (or the second video cassette) as they are because the water marks are embedded in the TS output from the first VCR. However, the distributed copyright protection information except for the CGMS flags can not be copied to the second video cassette because existing consumer D-VSH VCR's are so arranged as not to include the contents of the subcode area 23, the main header 33 and the DATA-AUX area 34 in the output stream.

Consumer VCR's are so arranged that CGMS flags are transferred to the destination cassette, and, if the CGMS flags have a value of "11", then the copying operation is prohibited. If the CGMS flags have a value of "10", then the copying operation is permitted and achieved with the CGMS flag value of the destination cassette changed from "10" to "11". In this way, the copyright of a prerecorded recording medium with a CGMS value of "10" is also protected after this medium has been copied once.

As described above, the copyright of the prerecorded video cassette recorded by the inventive VCR is properly protected in the existing VCR's depending on whether the CGMS value of the prerecorded video cassette is "10" or "11". However, more sophisticated copy protection is provided by a D-VHS player or a D-VHS VCR with a play mode according to this first embodiment of the invention.

Figure 8:
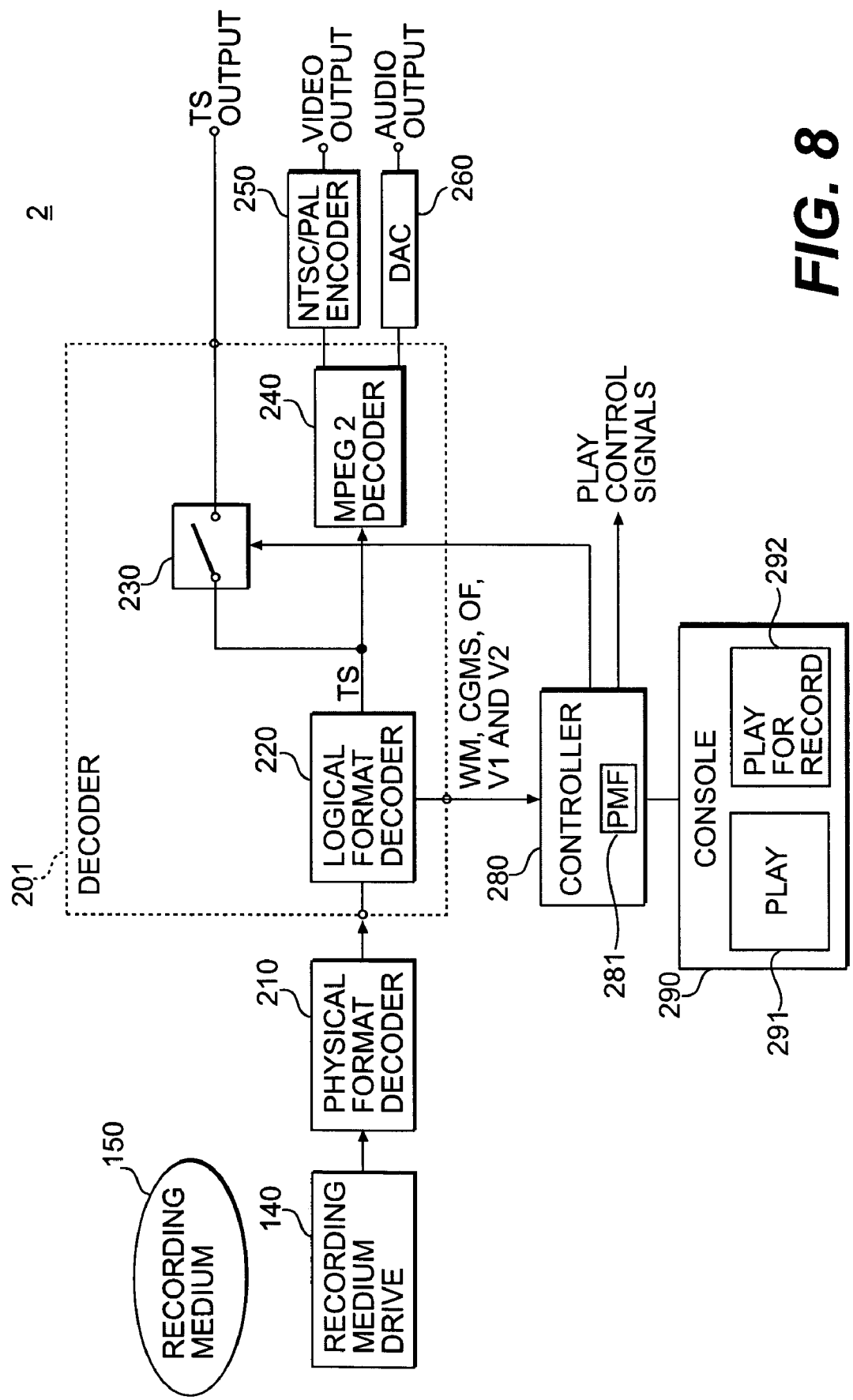
FIG. 8 is a schematic block diagram showing an exemplary arrangement of a D-VHS player or a D-VHS VCR in a play mode according to the first embodiment of the invention.

FIG. 8 is a schematic block diagram showing an exemplary arrangement of a D-VHS player or a D-VHS VCR in a play mode according to this first embodiment of the invention. In FIG. 8, the payer or VCR in a play mode, 2, comprises the recording medium drive 140 for recovering a signal recorded on the recording medium 150; a physical format decoder 210 having its input connected to a recording medium drive 140 output; a logical format decoder 220 having its input connected to a physical format decoder 210 output; a switch 230 having its first terminal connected to a logical format decoder 220 output; an MPEG-2 decoder 240 having its input connected to a logical format decoder 220 output; an NTSC/PAL encoder 250 having its input connected to an MPEG-2 decoder 240 video output, a digital-to-analog converter (DAC) 260 having its input connected to an MPEG-2 decoder 240 audio output; a controller 280 for controlling the playback operation of the player or VCR 2 through various play control signals and the switch 230 on the basis of the values of the water mark (WM) and DCPI values (i.e., CGMS. OF, V1 and V2); and a console 290 through which the user controls the D-VHS player (or a D-VHS VCR in a play mode) 2.

The console 290 may be optionally provided with a "play for record" button 292 in addition to an ordinary "play" button 291. Alternatively, instead of the play-for-record button 292, the console 290 may provided with a toggle switch (not shown) for selecting one of outputting only TV signals from the NTSC/PAL encoder 250 and DAC 260 and outputting both the TV signals and the TS stream from the switch 230. By doing this, the controller 280 can determine whether a play instruction is intended only for presentation or for recording and accordingly can control the output.

The elements 140, 210, 240, 250 and 260 are identical to conventional video cassette players, and accordingly the description of their operation will be omitted.

The controller 280 keeps a two-bit play mode flag PMF 281. The value of the play mode 281 is determined by the values of the water mark (WM) and DCPI values (i.e., CGMS. OF, V1 and V2). The controller 280 controls the switch 230 in response to the value of the play mode flag PMF 281.

Figure 10:
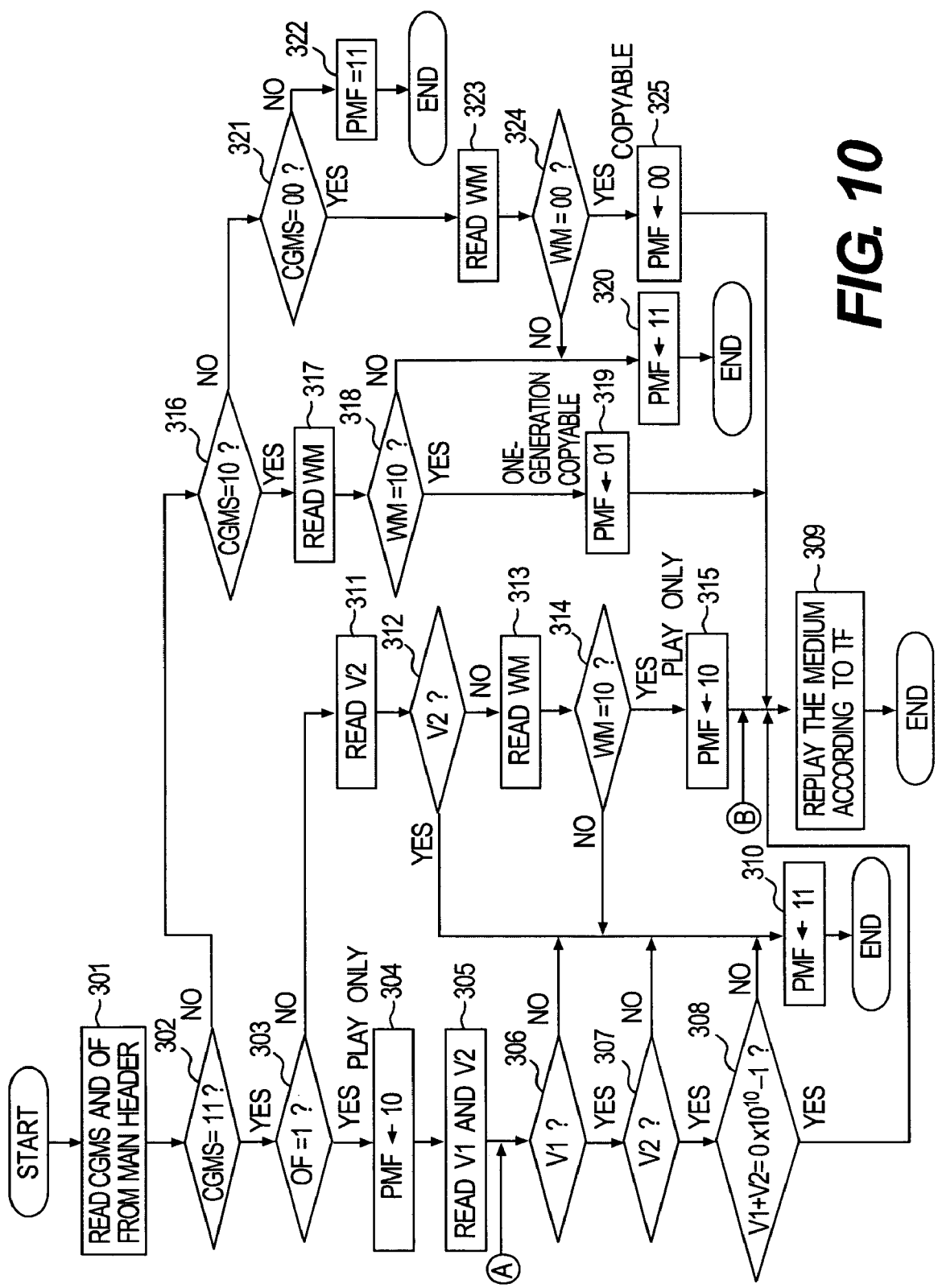
FIG. 10 is a flowchart showing the playback operation of the controller 280.

FIG. 9 is a table showing the relationship between the PMF value and the control of the switches 230 and 270. FIG. 10 is a flowchart showing the operation of the controller 280. The operation starts when the user has pressed a play button 291 of the console 290. Step 301 reads the CGMS and OF flags from the main header 33. Step 302 makes a test to see if the CGMS value is logical "11". If so, then step 303 makes a test to see if the OF flag is "1". If so, then step 304 sets the PMF to logical "10" determining the recording medium 150 to be copy-protected and play-only-permitted. Then, step 305 reads the DCPI first and second values V1 and V2 from the subcode 23 and the DATA-AUX packs 34, respectively. Steps 306 and 307 make tests to see if the values V1 and V2 exist, respectively. If both of the values V1 and V2 exist, then step 308 makes a test of validity of the values V1 and V2 by seeing if the sum of the values V1 and V2 equals $(0 \times 10^{10} - 1)$. If so, then, determining that the values V1 and V2 are valid, step 309 replays the recording medium 150 according to the value of the PMF flag 281. In this case, since the PMF is logical "10", the controller 280 plays the recording medium 150 with the switch 230 opened (OFF) according to the table of FIG. 9.

If the test result is NO in any of the steps 306 through 308, then the controller 280 sets the PMF flag to logical "11" in step 310 and terminates this operation.

If the CGMS value is not logical "11" in step 302, then step 316 makes a test to see if the CGMS value is logical "10". If so, then step 317 reads the water mark from TS output from the logical format decoder 220. Step 318 makes a test to see if the WM value is logical "10". If so, step 319 sets the PMF to logical "01" determining that the recording medium 150 is one-generation copyable and proceeds to the above-described step 309. In this case, if this play operation is intended not for recording but only for presentation (i.e., the play button 291 is pressed or the not-shown toggle switch is positioned at "TV"), then the controller 280 plays the recording medium 150 with the switch 230 open. If this play operation is in tended for recording (i.e., the play-for-record button 292 is pressed or the not-shown toggle switch is positioned at "TV+TS"), then the controller 280 changes the CGMS value from logical "10" to "11" and then plays the recording medium 150 with the switch 230 closed. If the WM value is not logical "10" in step 318, then step 320 stets the PMF to logical "11" and terminates this operation.

If the CGMS value is not logical "10" in step 361, then step 321 makes a test to see if the CGMS value is logical "00". If not, step 322 sets the PMF value to logical "11", and terminates this operation if the CGMS value is logical "00" in step 321, then step 323 reads the WM value from the TS. Step 324 makes a test to see if the WM value is logical "00". If not, step 320 sets the PMF value to logical "11", and terminates this operation. If the WM value is logical "00" in step 324, then step 325 sets the PMF value to logical "00" and proceeds to the above-described step 309. Step 309 plays the recording medium 150 with the switch 230 closed (ON).

If the OF value is not logical "1", then step 11 reads the DCPI second value V2 from the DATA-AUX packs 34. If the second value V2 exists, then step 310 sets the PMF value to logical "11", and terminates this operation. Otherwise, step 313 reads the WM value from the TS from the logical format decoder 220. Step 314 makes a test to see if the WM value is logical "10". If the WM value is not logical "10", then step 310 sets the PMF value to logical "11", and terminates this operation. If the WM value is logical "10", then step 315 sets the PMF value to logical "10" indicating a play only recording medium. Then, step 309 plays the recording medium with the switch 230 opened (OFF) and exits from this operation.

In this way, the copyright of the recording medium is protected by a D-VHS video player or a D-VHS VCR with a play mode according to the invention.

Embodiment II

Figure 11:
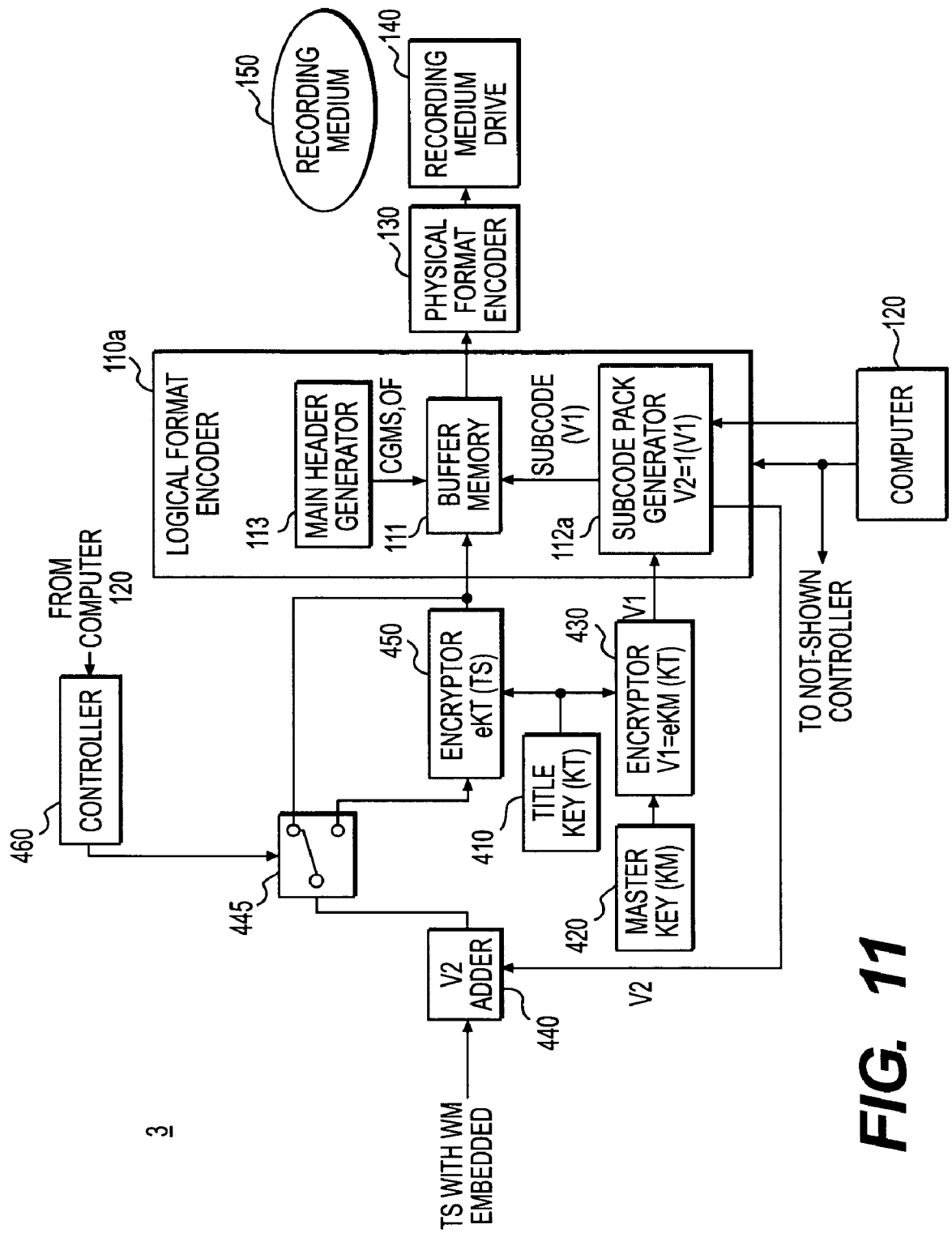
FIG. 11 is a schematic block diagram showing an exemplary arrangement of a VCR according to a second illustrative embodiment of the invention.

FIG. 11 is a schematic block diagram showing an exemplary arrangement of a VCR according to a second illustrative embodiment of the invention. In FIG. 11, the VCR 3 comprises a title key (KT) memory location 410, a master key (KM) memory location 420, a title key encryptor 430, a second DCPI value V2 adder 440, a 1-of-2 switch 445, a transport stream encryptor 450, a controller 460 and the remaining portion. The remaining portion is identical to the VCR 1 of FIG. 1 except that the subcode pack generator 112 has been replaced with a subcode pack generator 112a.

In operation, the title key encryptor 430 encrypts the title key KT by using the master key KM to obtain a KM-encrypted title key (i.e., eKM(KT)) as the above-described first DCPI value V1. That is, V1 is obtained as follows:

$$V1 = eKM(KT) \quad (3)$$

The encryptor 430 passes the first DCPI value V1 to the subcode pack generator 112a. The subcode pack generator 112a generates a subcode pack 40 containing the value V1 and finds V2 according to the equation (1) to pass to the V2 adder 440.

Figure 12:
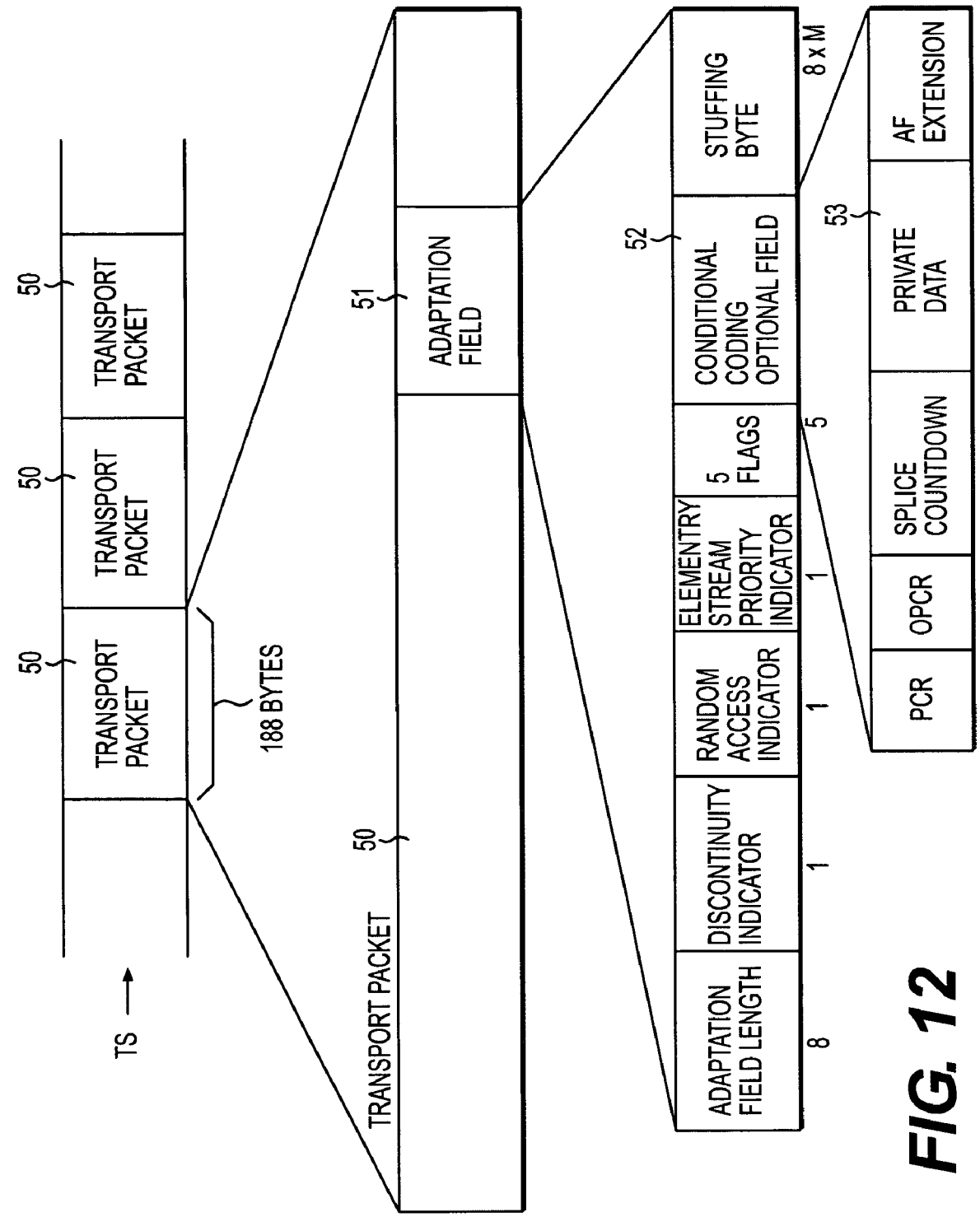
FIG. 12 is a diagram showing a suitable location for inserting a piece of distributed copyright protection information (DCPI) such as the second DCPI value V2 in the transport stream.

The V2 adder 440 inserts the second DCPI value V2 in the transport stream. In this specific embodiment, the value V2 is inserted in, for example, a "private_data_byte" field 53 in a optional field 52 of the "adaptation_field" 51 of each transport packet 50 of the MPEG-2 transport stream as shown in FIG. 12.

If the recording media 150 is to be copy-protected, then the controller 460 controls the switch 445 so as to couple the adder 440 output to the encryptor 450 and sets the OF flag to logical "1". If not, then the controller 460 controls the switch 445 so as to couple the adder 440 output to the logical format encoder 110a and sets the OF flag to "0".

Then, the encryptor 450 encrypts the transport stream from the V2 adder 440 except for the added value V2 by using the title key KT. The encrypted output from the encryptor 450 is supplied to the logical format encoder 110a. The CGMS and OF flags and the DCPI first value V1 are inserted in each track in the manner described in the first embodiment.

Figure 13:
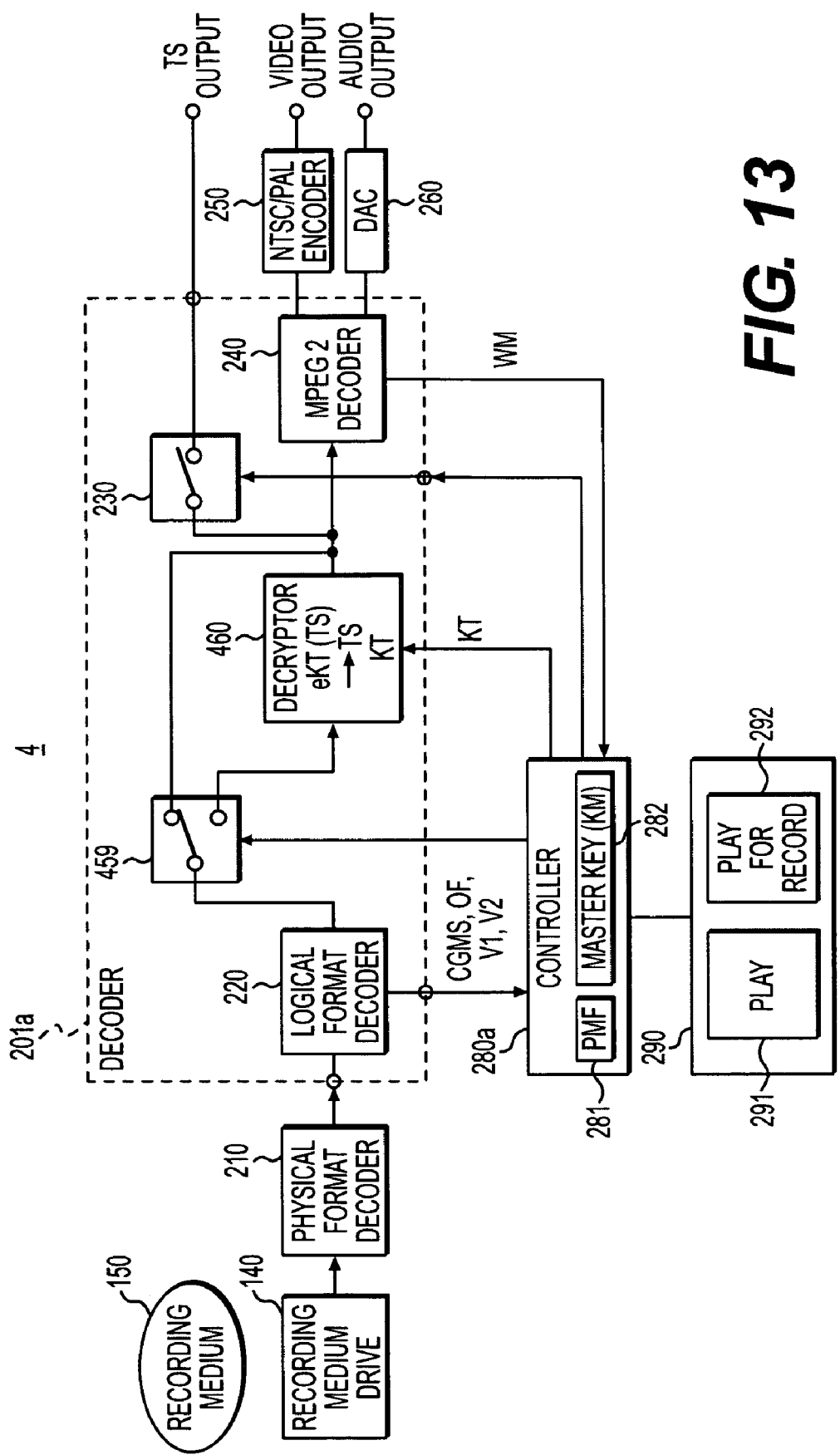
FIG. 13 is a schematic block diagram showing an exemplary arrangement of a D-VHS player or a D-VHS VCR in a play mode according to a second illustrative embodiment of the invention.

FIG. 13 is a schematic block diagram showing an exemplary arrangement of a D-VHS player or a D-VHS VCR in a play mode according to the second embodiment of the invention. The D-VHS player (or D-VHS VCR in a play mode) 4 of FIG. 13 is identical to that of FIG. 8 except that a 1-of-2 switch 459 and a decryptor 460 has been inserted between the logical format decoder 220 and the MPEG-2 decoder 240, and the controller 280 has been replaced by a controller 280a.

In this case, the controller 280a obtains the CGMS and OF flags, the first and second DCPI values V1 and V2 from the logical format decoder 220 output. If the recording media 150 is copy-protected, i.e. the OF flag is logical "1", then the controller 280a controls the switch 459 so as to couple the logical format decoder 220 output to the decryptor 460. If the recording media 150 is not copy-protected, i.e., the OF flag is "0", then the controller 280a controls the switch 459 so as to couple the logical format decoder 220 output to the MPEG-2 decoder 420.

In addition to the PMF flag stored in location 281, the controller 280a further stores the master key (KM) in memory 282 so as to decrypt the first DCPI value V1 with the master key as follows:

$$dKM(V1) = dKM(eKM(KT)) \quad (4)$$
$$= KT,$$

where dKM(V1) means V1 decrypted with the master key KM.

The controller 280a supplies thus obtained title key dKM(V1) to the decryptor 460. The decryptor 460 decrypts the data stream from the logical format decoder 220 with the title key dKM(V1) to obtain the transport stream, which is supplied to the MPEG-2 decoder 240 and the switch 230. Then, the controller 280a obtains the WM value from the transport stream. The subsequent operation is identical to that of the D-VHS player (or D-VHS VCR in a play mode) 2 of FIG. 8. The flowchart of FIG. 10 and the table of FIG. 9 are also true to this embodiment.

According to the second embodiment of the invention, the encrypted versions of the title key KT and the transport stream are recorded in a video cassette. This provides higher copyright protection as compared with the first embodiment.

Though the encrypted second DCPI value V2 is inserted in the transport stream in this embodiment, it may be inserted in the DATA-A UX area 34 as in case of the first embodiment.

An arrangement may be made such that many keys are stored in memory and the addresses of the stored keys are recorded as the DCPI values.

By multiplying the title key by a larger value, the title key may be made longer in length.

A further arrangement may be made such that keys are stored in an external storage such as an IC card or a smart card, and information necessary for accessing the stored keys are recorded as the DCPI values.

Embodiment III

Figure 14:
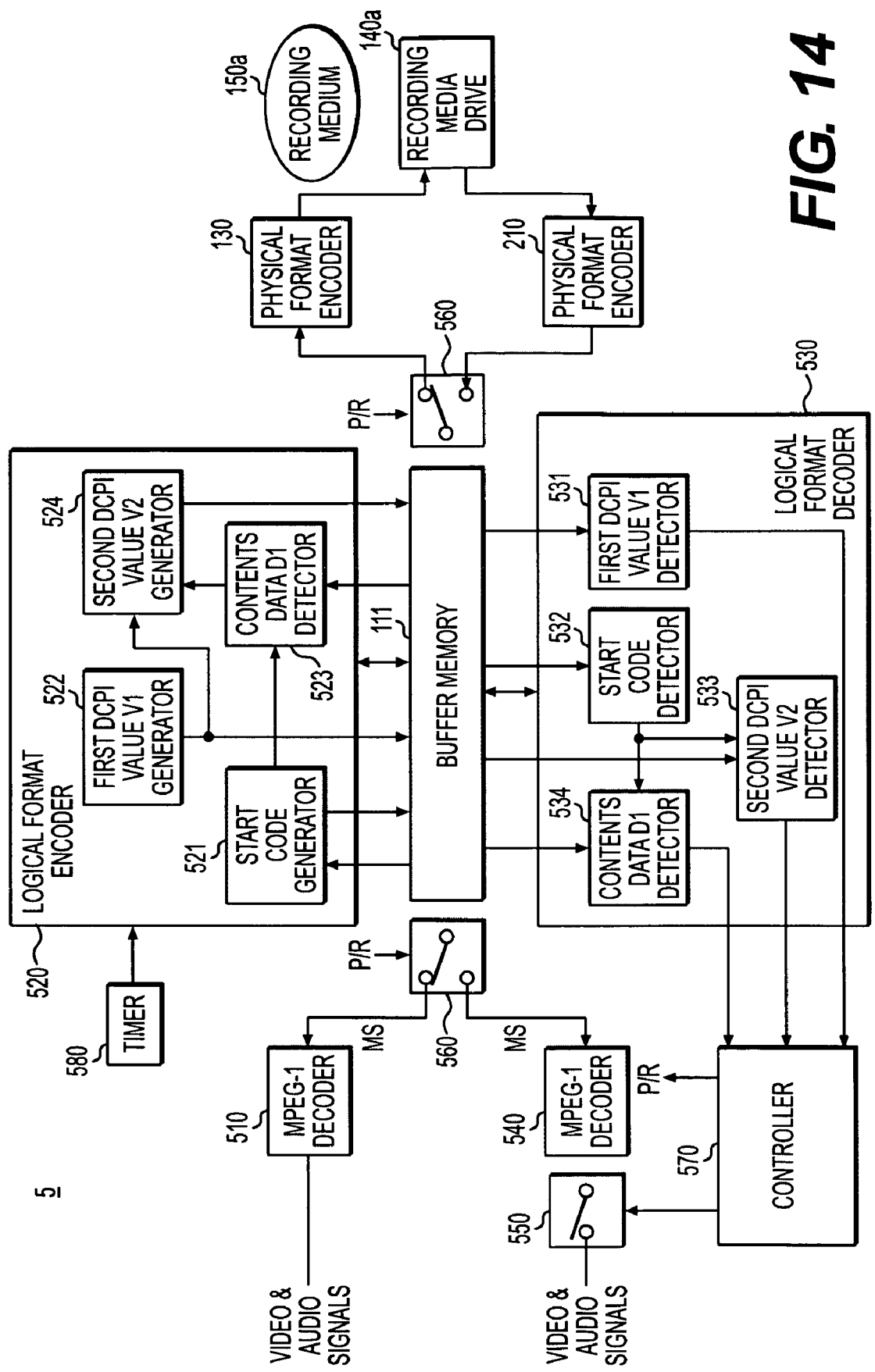
FIG. 14 is a schematic block diagram showing an exemplary arrangement of a VCR in a record mode according to a third embodiment of the invention.

FIG. 14 is a schematic block diagram showing an exemplary arrangement of a digital video cassette recorder (DVCR) in a record mode according to a third embodiment of the invention. In FIG. 14, the DVCR 5 comprises a MPEG-1 encoder 510, a logical format encoder 520, the buffer memory 111, the physical format encoder 130, a recording medium drive 140a, the physical format decoder 210, a logical format decoder 530, an MPEG-1 decoder 540, an ON/OFF switch 550, changeover switches 560 for changing the operation mode between playback and record, a controller 570 and a timer 580. The buffer memory 111, the recording medium driver 140a, the changeover switches 560, and the controller 570 are common to the playback system and the record system of the DVCR 5. The changeover switches 560 are controlled by a playback/record control signal (P/R) supplied from the controller 570.

The logical format encoder 520 includes a start code generator 521, a first DCPI (distributed copyright protection information) value Vt generator 522, a content data detector 523, and a second DCPI value generator 524. The logical format decoder 530 includes a start code generator 521, a first DCPI value Vt detector 531, a start code detector 532, a second DCPI value detector 533, and a contents data detector 534.

Figure 15:
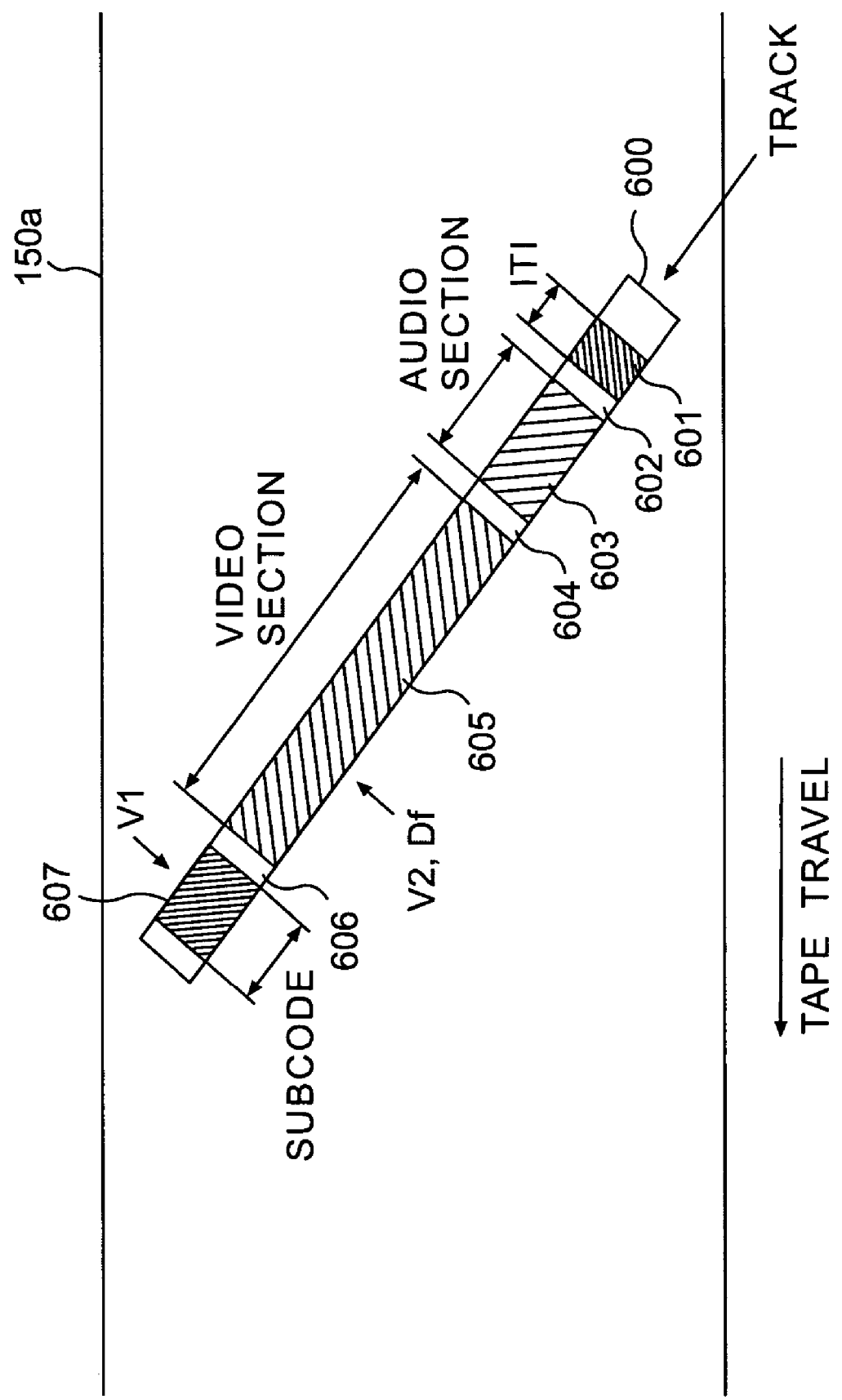
FIG. 15 is a diagram showing a format of each of the tracks recorded on the video cassette tape 150a in the DV (digital video) format.

In record operation, the controller 570 first supplies a playback/record signal to the switches 560 such that the buffer memory 111 is connected to the MPEG-1 encoder 510 and the physical format encoder 130. Video and audio signals are input to the MPEG-1 encoder 510 and compressed into an MPEG-1 stream (MS). The MS stream is logical-format-encoded by the encoder 520 into a sequence of data tracks as shown in FIG. 15. In the case, various DCPI values are embedded in the track sequence as detailed later. Thereafter, the track sequence is recorded on the video cassette 150*a* in a well-known manner.

FIG. 15 is a diagram showing a format of each of the tracks recorded on the video cassette tape 150*a* in the DV (digital video) format. In FIG. 15, each track 600 comprises an ITI (insert and track information) section 601, an audio section 603, a video section 605, a subcode section 607, and gaps 602, 604 and 606.

This embodiment uses first through third DCPI values V1, V2 and Df as the distributed copyright protection information. The first DCPI value V1 is, for example, a single-byte value calculated by the following equation:

$$V1 = Rt \bmod 256, \quad (5)$$

where Rt is a random number generated every frame (i.e., every 29.97 seconds), and Rt mod 256 is the reminder when the random number Rt is divided by a constant 256.

According to this embodiment, the first CDPI value V1 is recorded in the subcode section 607 in the same manner as described in reference with FIG. 4. However, The other DCPI values are recorded not in user-unrewritable areas as mentioned above but in the MPEG-1 stream from the MPEG-1 encoder 510.

Generally speaking, the DCPI values can be inserted in the "user_data" field (in case of MPEG-1), the "private_data_byte" field (in case of MPEG-2), or a data packet defined as the "private_stream".

For example, in an MPEG-2 transport stream, setting the transport_private_data_flag to 1 enables an explicit indication of the presence of the private_data. A private_data of the length set in the transport_private_data_length can be inserted as long as the length does not exceed the length of the transport packet.

Also, data may be sent by setting the private_stream in the stream_id of the packet_start_code in case of an MPEG system.

Figure 16:
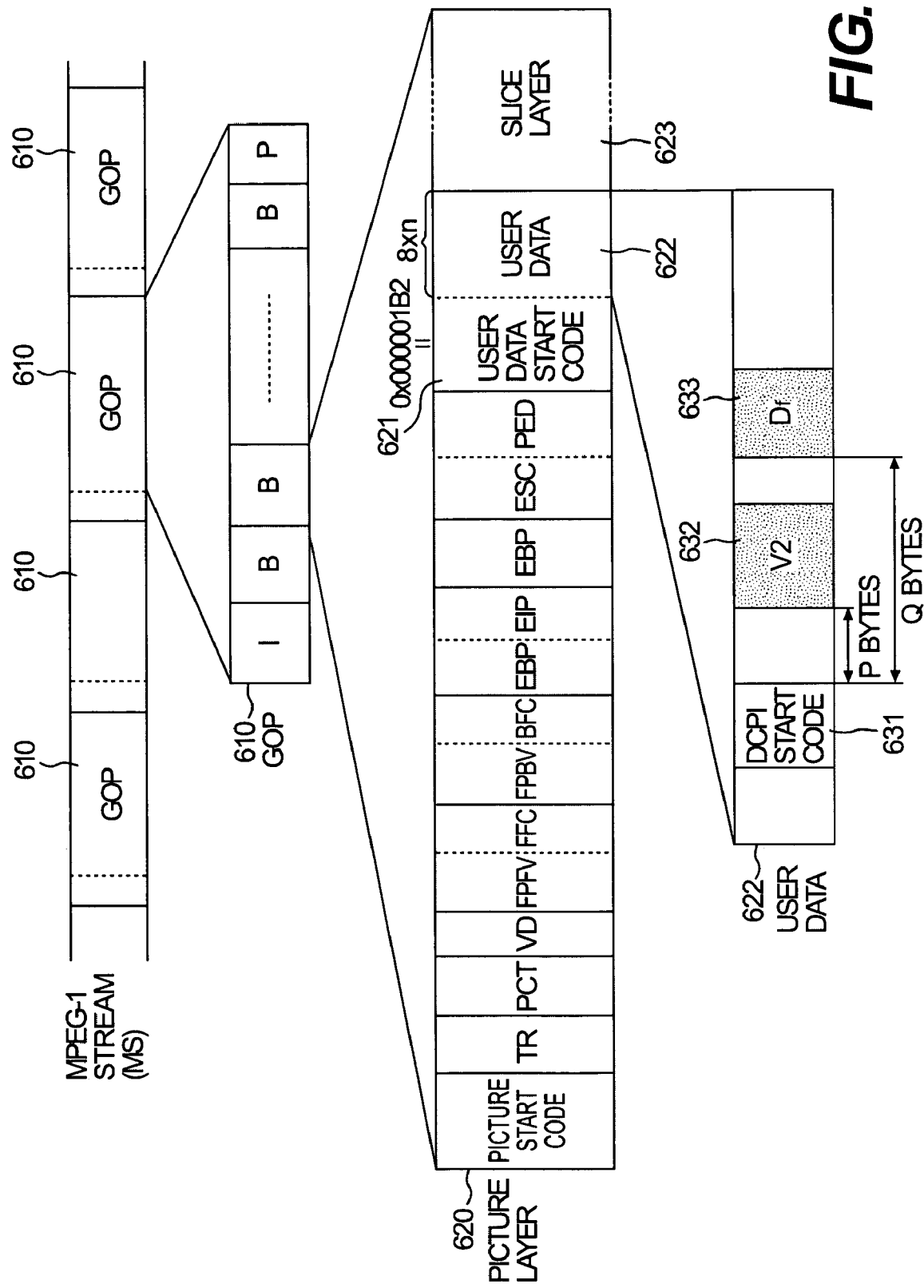
FIG. 16 is a diagram showing an arrangement of an MPEG-1 stream.

Since this embodiment uses an MPEG-1 stream, the user_data is used. FIG. 16 is a diagram showing an arrangement of an MPEG-1 stream. In FIG. 16, the MPEG-1 stream comprises a sequence of GOP's (group of pictures) 610. In a picture 620, inserting a user_data_strat_code 621 enables user_data 622 to be added by a unit of 8 bits. The user_data_strat_code 621 is defined as 0x000001B2 in the MPEG standard.

A predetermined DCPI start code 631, e.g., 0x0f0f0f0f2428fdaa is first inserted at a desired position in a user_data 622. The second DCPI value V2 632 is placed P bytes after the DCPI start code 631. The third DCPI value Df 633 is placed Q bytes after the DCPI start code 631, where P+L≦Q, where L is the length of the second DCPI value V2. It may be preferable to place the DCPI start code. 631 at the beginning of the user_data 622 field, and to place the second and third DCPI values V2 and Df in succession.

The third DCPI value Df is a predetermined length of data a predetermined bytes after a predetermined sync signal in the MPEG-1 stream, e.g., a predetermined portion of the slice layer 623 following the user_data 622. Or, the third DCPI value Df may be any suitable value given as the value of a function of such the data or predetermined portion. It is assumed that the first through third CDPI values V1, V2 and Df satisfies the following relationship:

$$V2 = C2[F-(Df \times V1) \bmod 256], \quad (6)$$

where C2[X] is an expression of X in a 2's complement, F is a single-byte authenticator in the range from 0 to 255.

Assuming that the authenticator F is zero, then the equation (6) becomes:

$$V2 = C2[-(Df \times V1) \bmod 256] \quad (7)$$
$$= 0 \times 0100 \cdot (Df \times V1) \bmod 256$$

If $V1 = 82$ and $Df = 120$, then we obtain:

$$V2 = 0 \times 0100 - (120 \times 82) \bmod 256$$
$$= 256 - 112$$
$$= 144.$$

If the recording medium 150*a* does not need copy protection, then the first and second DCPI values are set to 0.

In recording operation, the timer 580 generates a trigger signal at intervals determined by the frequency of the authentication frequency to supply the trigger to the logical format encoder 520. The intervals are, for example, a frame cycle, i. e., 1/29.97 seconds.

Figure 17:
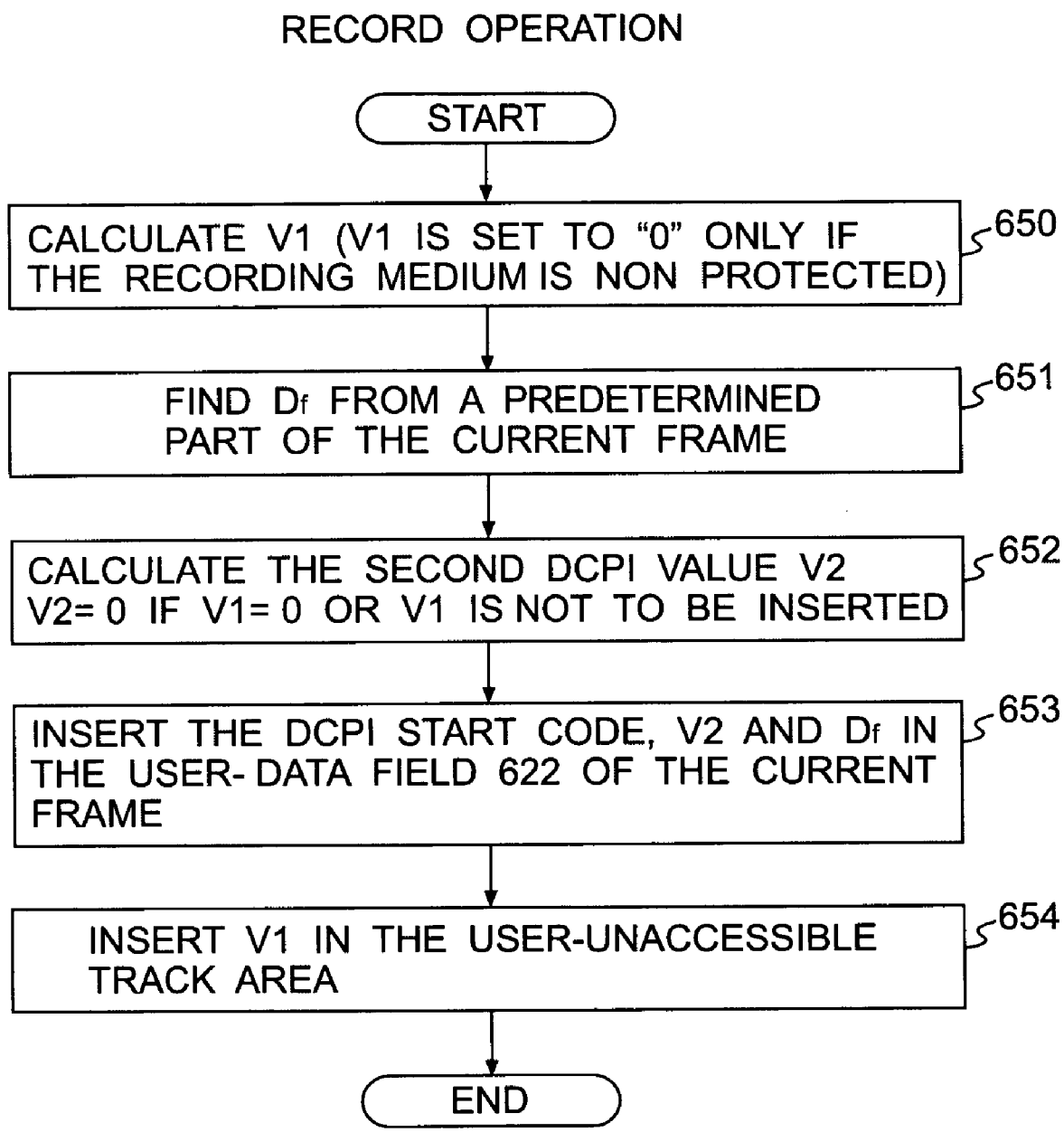
FIG. 17 is a flowchart showing a record operation of the logical format encoder 520 executed in response to the trigger signal from the timer 580.

FIG. 17 is a flowchart showing a record operation of the logical format encoder 520 executed in response to the trigger signal from the timer 580. In FIG. 17, step 650 calculates the first value V1 by using the equation (5). The value is set to "0" only if the recording medium 150*a* is unprotected. Step 651 finds the third value Df from a predetermined portion of the current frame. Step 652 calculates the second DCPI value V2. In this case, the value V2 is set to "0" if the DCPI first value V1 is 0 or is not to be recorded. Step 653 inserts the DCPI start code, the second and third DCPI values V2 and Df in the user_data field 622 of the current frame or picture. Step 654 insert the first DCPI value V1 in the unrewritable track area, e.g., the subcode section 607.

Figure 18:
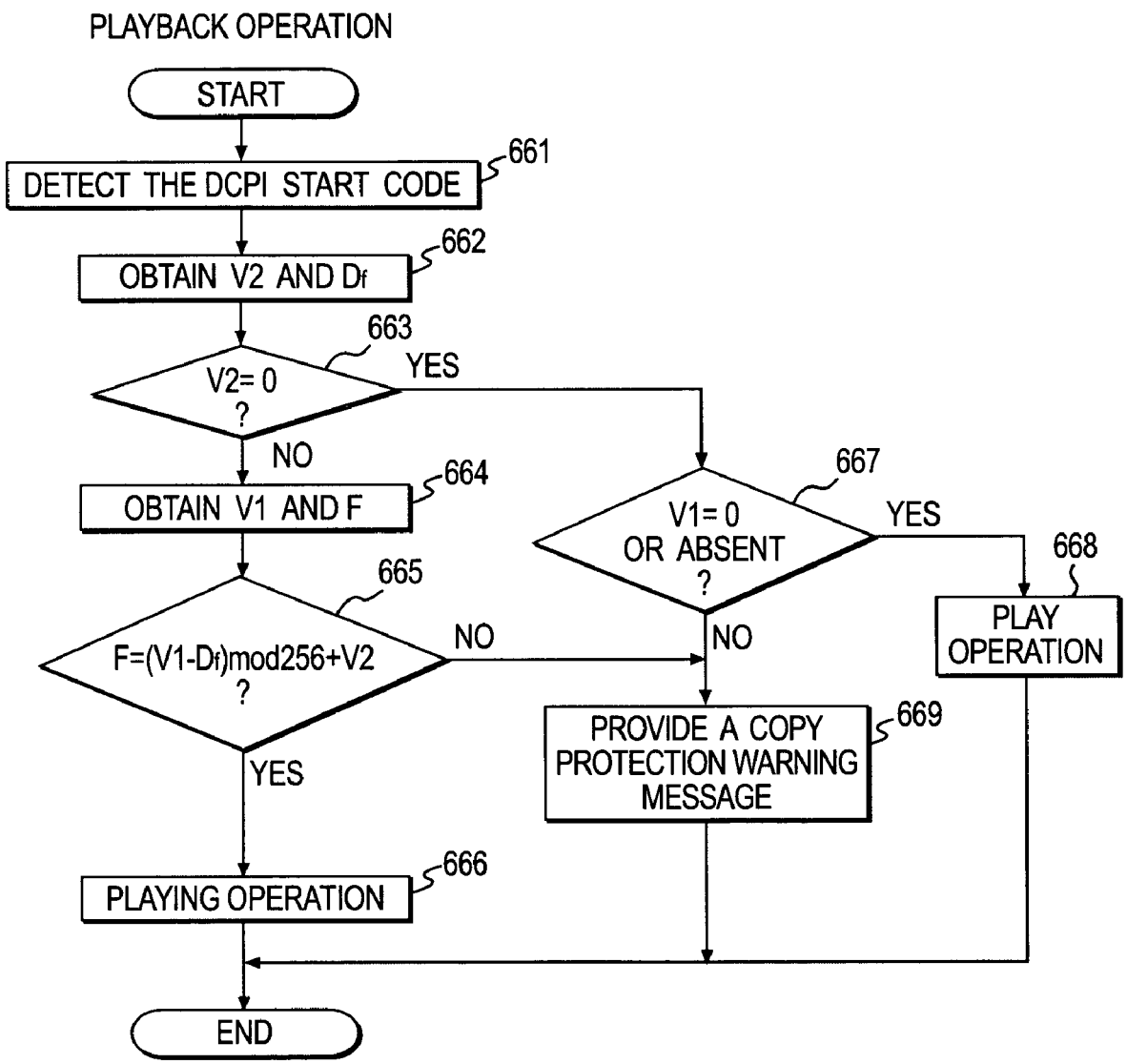
FIG. 18 is a flowchart showing a playback operation of the logical format decoder 530.

FIG. 18 is a flowchart showing a playback operation of the logical format decoder 530. In FIG. 18, the start code detector 532 detects the DCPI start code, i.e., 0x0f0f0f0f2428fdaa in the data stream from the physical format decoder 210 in step 661. The second and third DCPI values V2 and Df are obtained from the user_data 622 in step 662. A test is made to see if the value V2 is 0 in step 663. If not, then obtaining the first value V1 and the authenticator F which is stored in a predetermined location in memory (not shown) in step 664, a test is made to see if the following equation is true in step 665.

$$F = (V1 \times Df) \bmod 256 + V2 \quad (8)$$

If so, then playing operation is started. If the value V2 is 0 in step 663, then step 667 makes attest to see if the first DCPI value V1 is 0 or absent in the subcode section 607. If so, then step 668 executes a play operation and thereafter terminates the operation. Otherwise, step 669 provides a copy protection warning message and terminates the operation.

As described above, if the recording media is copied to a destination medium, though the second and third DCPI values V2 and Df are copied to the destination medium, the first DCPI value V1 is not transferred to the destination medium. This is because the contents of the subcode section 607 where the V1 is recorded are not output from the logical format decoder 530. For this reason, the equation (8) is no longer true for such the destination recording medium. Thus, the controller 570 can prohibit the playback of a pirated recording medium.

Though the third illustrative embodiment did not used the CGMS and OF flags, the DV video cassette recorder 5 can use the CGMS and OF flags to provide more sophisticated copy protection functions.

Modification

Though we have described illustrative embodiments of the invention in connection with video tape recorders, the invention is applicable to such various recording media as have a user-rewritable area and an unrewritable (or user-inaccessible) area. Such recording media include video tapes, video cassettes, various optical discs, hard discs, semiconductor memory system comprising a RAM (random access memory) area and a ROM (read only memory) area, etc.

Figure 19:
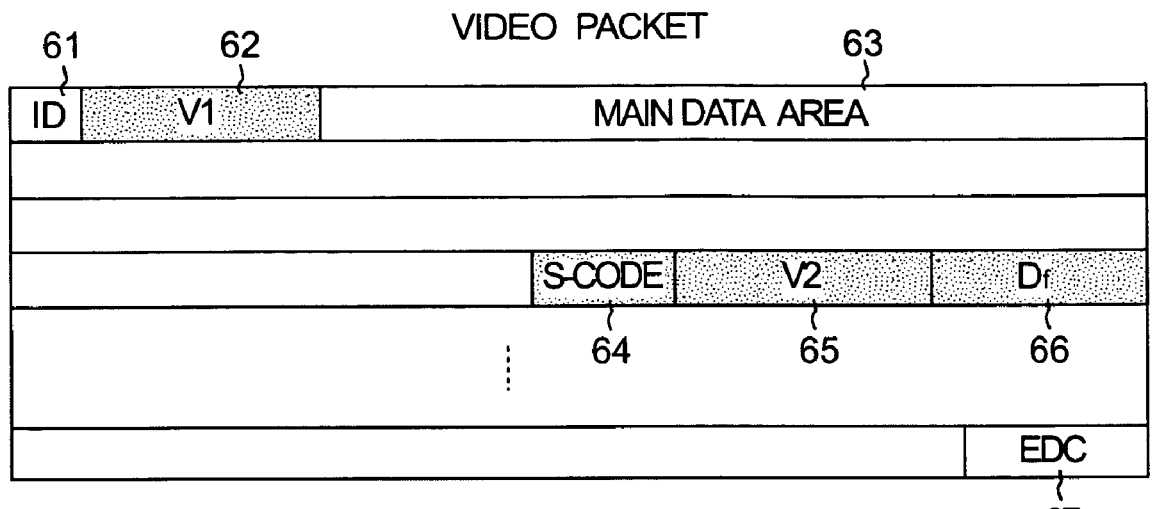
FIG. 19 is a diagram showing an example of a disc recording medium to which the invention has been applied.

FIG. 19 is a diagram showing an example of a disc recording medium to which the invention has been applied. In case of disc recording medium, audio and video data are recorded on the disc in the form of packets. FIG. 19 shows a sector of 2k bytes. The sector comprises an ID area 61, a first DCPI value area 62, a main data area 63, and an error correcting code area 67. In the main data area 63 that contains contents data, there are disposed a DCPI start code (S-CODE) area 64, a second DCPI value (V2) area 65 and a third DCPI value (Df) area 66. The areas 51, 52 and 57 are user-unrewritable areas. The disc may be either a hard disc or an optical disc.

Figure 20:
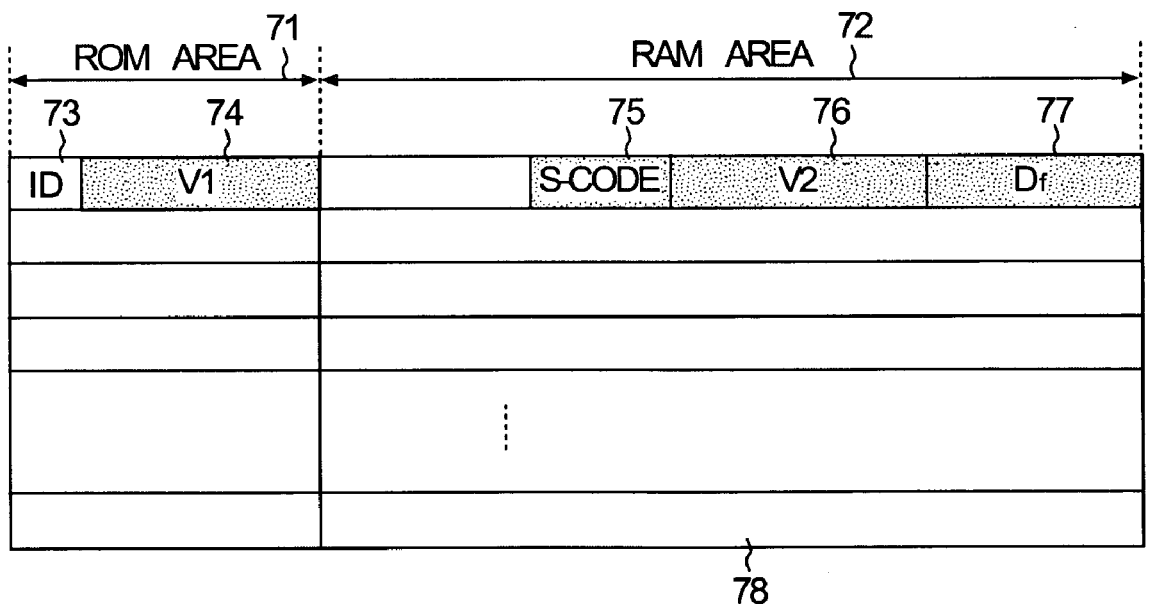
FIG. 20 is a diagram showing an exemplary arrangement of a semiconductor memory system comprising a ROM area and a RAM area.

FIG. 20 is a diagram showing an exemplary arrangement of a semiconductor memory system comprising a ROM area 71 and a RAM area 72. An ID field 73 and a V1 field 74 are disposed in the unrewritable ROM area 71. The DCPI start code (S-CODE) area 75, the second and third DCPI value areas 76 and 77 are disposed in a contents recording area 78 in the RAM area 72.

Embodiment IV

If a prerecorded medium with an water mark value of "11" is copied to make a pirated copy by any counterfeiter recording the analog signal output from the player 2 of FIG. 2 or the player 4 of FIG. 13 while changing the water mark value from "11" to "10", then the pirated copy no not include the second DCPI value (V2) because the Value V2 is not transferred to the recording recorder. If the counterfeiter tries to playback the pirated medium, then he or she can successfully playback the pirated medium because the second DCPI value V2 is not found in step 312 and the test is passed in step 314 in FIG. 10.

Figure 21:
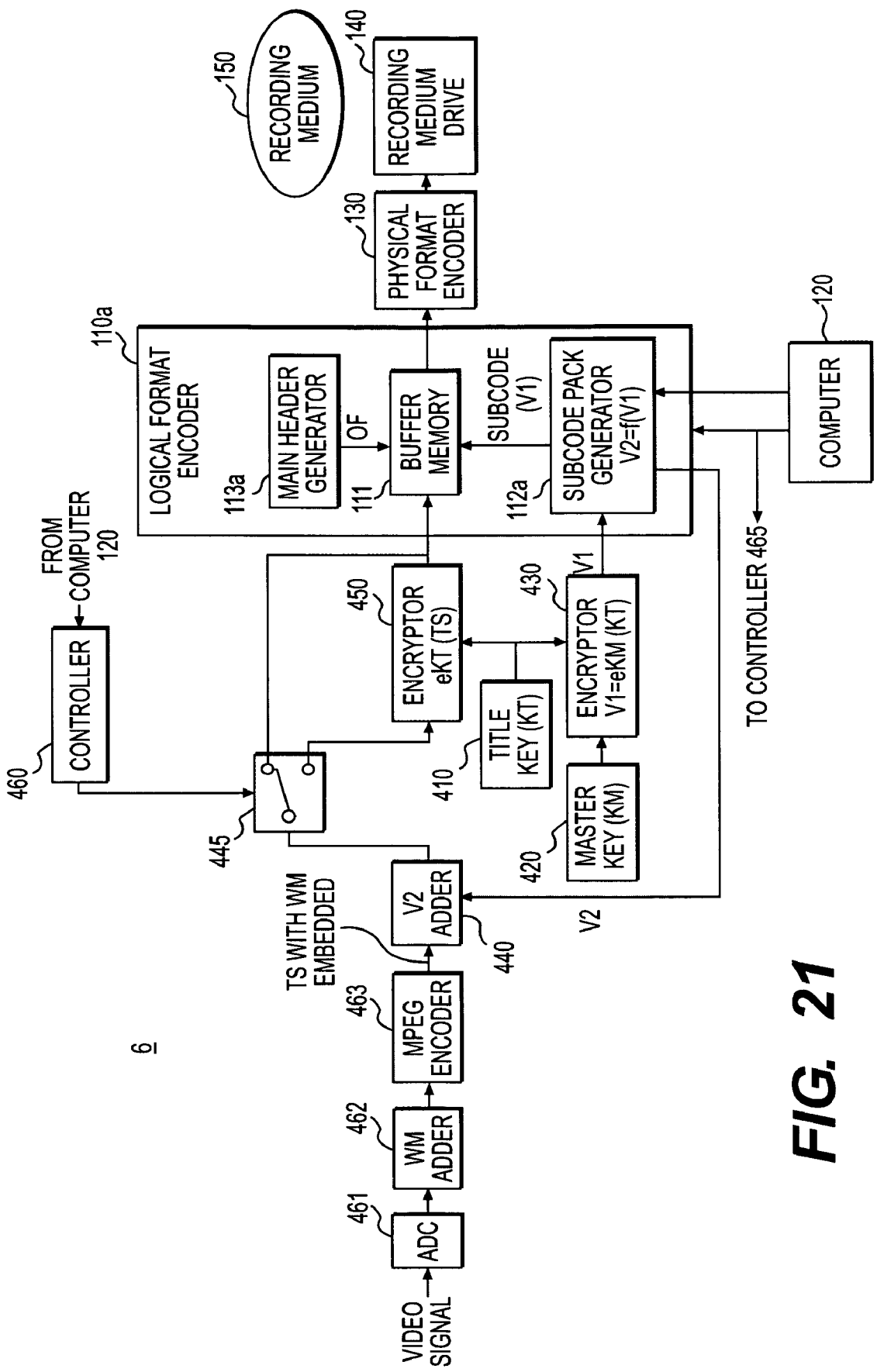
FIG. 21 is, a diagram showing an exemplary arrangement of a business-use VCR according to a fourth illustrative embodiment of the invention.

In order to avoid this problem that can be caused by D-VHS recorders or DVD recorders provided with a decoder, a new copy protection scheme is required. FIG. 21 is a schematic block diagram showing an exemplary arrangement of a VCR according to a fourth illustrative embodiment of the invention. The VCR 6 of FIG. 6 is identical to that of FIG. 11 except that an analog-to-digital converter 461, a WM adder 462, and an MPEG encoder 463 have been added and the main header generator 113 has been replaced by a main header generator 113a in FIG. 21. The only difference between the main header generators 113 and 113a is that the generator 113a only inserts the OF flag in the main header. That is, the VCR 6 does not use the CGMS data.

In recording operation, a video signal input is converted into a digital video signal in ADC 461. The water mark (WM) adder 462 embeds water marks in the digital video signal in a well-known manner according to the copyright protection class of the recording media on which the video signal is to be recorded. The WM-embedded digital signal is compressed and encoded by the MPEG encoder 463 into a WM-embedded MPEG stream in a well-known manner. Thereafter, the operation is identical to that of the recorder 3 of FIG. 11.

A player or a VCR in a playback mode corresponding to this specific embodiment is identical to that of FIG. 13 except that this embodiment does not use the CGMS data. That is, the fourth embodiment uses the CGMS bits of the water mark instead of the CGMS data which is inserted in the main header 33 in the first and second embodiments.

Figure 22:
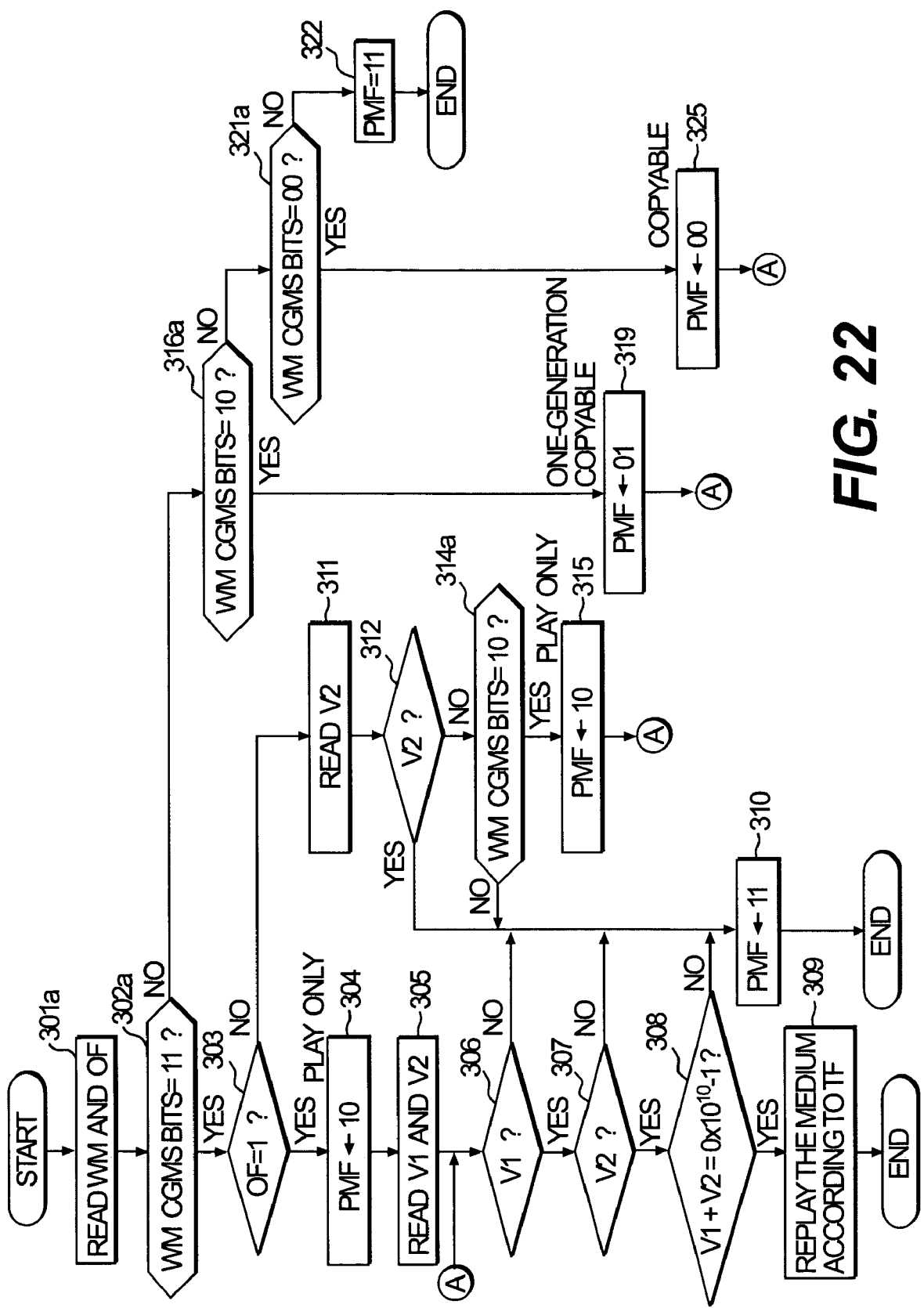
FIG. 22 is a flowchart showing the playing operation of a player or a VCR in a playback mode according to the fourth illustrative embodiment of the invention.

FIG. 22 is a flowchart showing the playback operation of the player or the VCR in a playback mode according to the fourth embodiment. The flowchart of FIG. 22 is identical to that of FIG. 10 except that steps 301a, 302a, 314a, 316a and 321a use the water mark's CGMS bits instead of the CGMS data; steps 313, 317, 318, 320, 323 and 324 has been eliminated; and the control is passed to step 306 after any of steps 315, 319 and 325.

The Macrovision signal, the C-GMSA signal, the water marks, etc. are usually used for the protection of analog copying by a recorder with an encoder. However, recorders manufactured before the introduction of the water mark permit the recording of the recording media from which the Macrovision signals and the C-GMSA signals have been removed. On the other hand, if a copy is made by using the inventive VCR 6, the OF flag of the copy is set to 0. This prohibits the digital copy as shown in FIG. 22. Even if the OF flag has been changed to 1 by any organized counterfeiter group, such pirated copies will not pass the tests 306 through 308 that uses the first and second DCPI values V1 and V2.

Embodiment V

The serial interface according to the IEEE1394-1995 standard is becoming popular in transmitting video audio data. A copyright protection code known as the EMI (encryption mode indicator) in a copy protection scheme known as DTCP (Digital Transmission Content Protection) which is intended for the IEEE1394-1995 standard. A video decoder will be described which is provide with an IEEE1394 receiver and uses the EMI code for copy protection.

Figure 23:
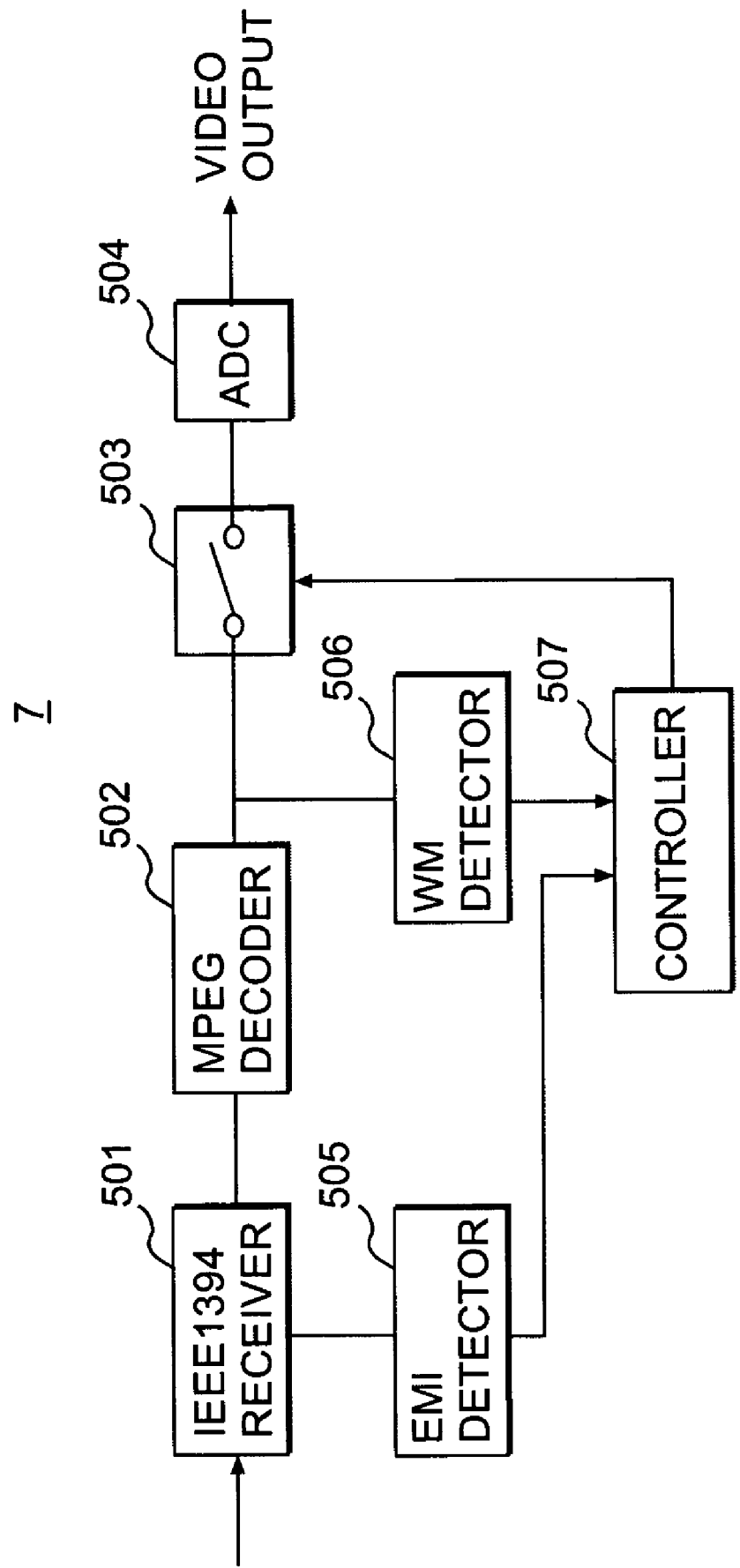
FIG. 23 is a schematic block diagram showing an arrangement of a video decoder for converting the digital interface (DIF) format signal defined by the IEEE1394-1995 standard into an NTSC signal in accordance with a fifth illustrative embodiment of the invention.
Figure 24:
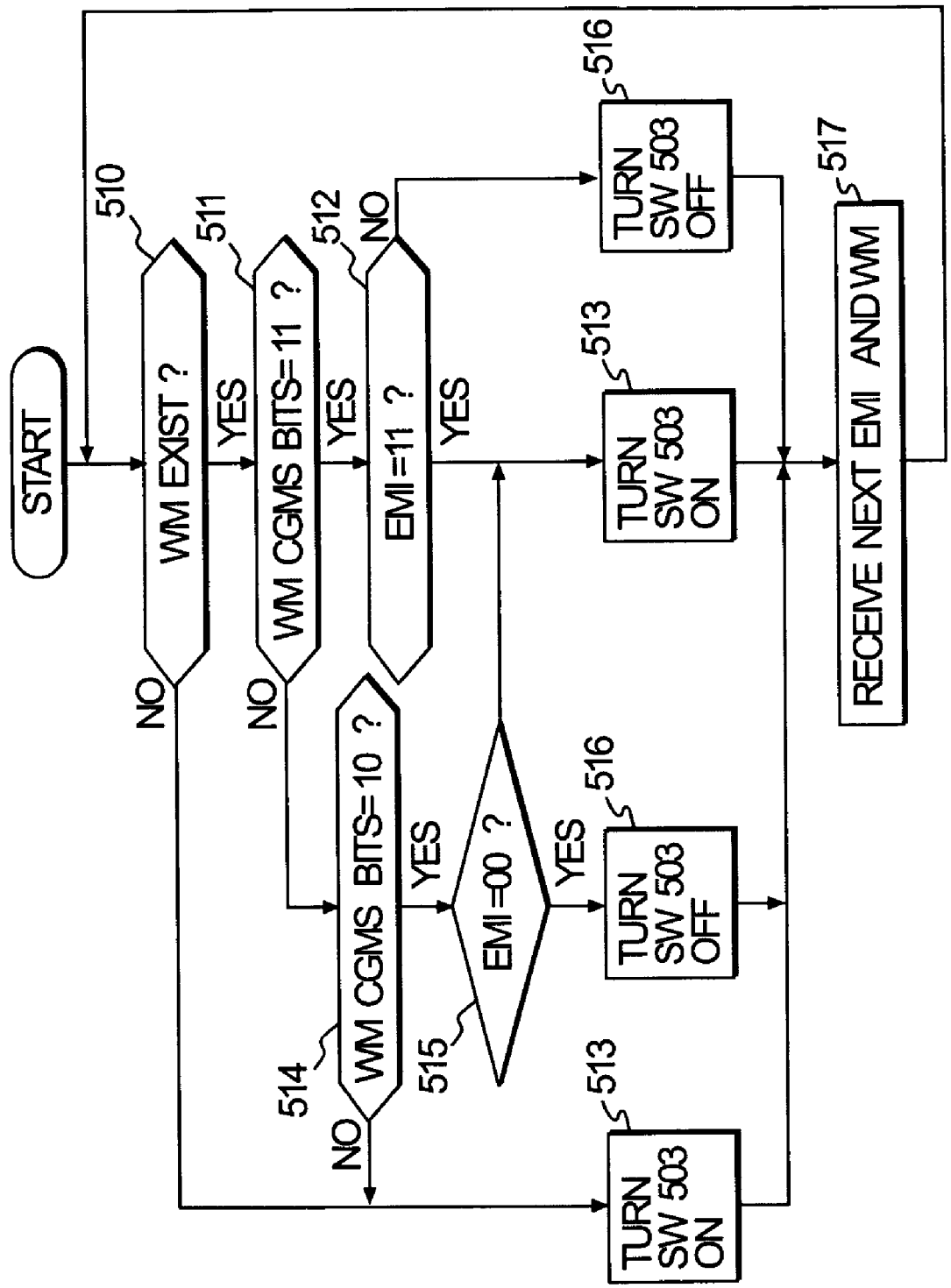
FIG. 24 is a flowchart showing the operation of the video decoder of FIG. 23.

FIG. 23 is a schematic block diagram showing an arrangement of a video decoder for converting an input signal of the digital interface (DIF) format defined by the IEEE1394-1995 standard-into an NTSC signal in accordance with a fifth illustrative embodiment of the invention. In FIG. 24 the video decoder 7 comprises an IEEE1394 receiver 501 for converting the input signal into an MPEG bit stream, an MPEG decoder 502 for converting the MPEG bit stream into an expanded decoded digital video signal, an on-off switch 503 for connecting and disconnecting the digital video signal to and from the next stage, an analog-to-digital converter (ADC) 504 for the signal from the switch 503 into an analog video signal, an EMI (encryption mode indicator)

detector 505, a WM detector 506 and a controller 507. The detected EMI code and the WM are passed to the controller 507 for controlling the operation of the video decoder 7.

The EMI code is a two-bit code defined in the following table.

TABLE

| EMI code | Meaning |
|---|---|
| 00 | copy free |
| 01 | no more copy |
| 10 | one-generation copyable |
| 11 | copy protected |

The EMI code is inserted in the input signal by the IEEE1394 transmitter of the device transmitting the input signal when the input signal is transmitted.

FIG. 24 is a flowchart showing the operation of the video decoder, i.e., the controller 507 of FIG. 23. In step 510, the controller 507 makes a test to see if the water mark exists in the MPEG decoder 502 output. If not, then the controller 507 turns the switch 503 on to output the video signal in step 513, and receives the next EMI code and WM in step 517 to return to step 510. If the test result is YES in step 510, then the controller 507 makes a test in step 511 to see if the water mark CGMS bits are logical "11". If so, then the controller 507 makes another test to see if the EMI code is logical "11" in step 512. If so, then the controller 507 turns the switch 503 on to output the video signal in step 513, and again proceeds to step 517 to return to step 510. If not, the controller 507 turns the switch 503 off in step 516 to prevent the video signal from being output, and proceeds to step 517 to return step 510.

If the test result is no in step 511, then the controller 507 makes a test to see if the water mark CGMS bits are 10 in step 514. If not, the controller 507 turns the switch 503 on and proceeds to step 517. If the test result is YES in step 514, the controller 507 makes a test to see if the EMI code is logical "00" in step 515. If so, the controller 507 turns the switch 503 off in step 516 and proceed to step 517. If not, the controller 507 proceed to the above step 513.

It is preferable to display a message to the effect that the input signal is from a pirated copy.

It is noted that this embodiment is applicable to a TV set incorporating a video decoder as shown in FIG. 23.

The first through fourth embodiments of the invention may be incorporated in any TV sets.

In the above embodiments, the output control has been described as controlled by switches. However, the switches are used for conceptually or symbolically showing the permission and the prohibition of the output. Accordingly, the output may be controlled by enabling or disabling one or more elements connected in series with the shown switches.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of recording digital data that may be authenticated into a recording medium in a recording format, the method comprising the steps of:

recording in advance a first value into the recording medium in the recording format as data that cannot be output as a playback signal from a playback apparatus used for the recording medium; and recording content data prepared to be played back, sync data and a second value into the recording medium in the recording format as the digital data that may be output as playback signals from the playback apparatus;

wherein the second value is placed at a position apart from the sync data by a first distance, a portion of the content data having a length of a predetermined number of bits is placed at a position apart from the sync data by a second distance, a value of an authenticator is determined according to a predetermined formula from the first value, the portion of the content data and the second value, and the second value is set so as to have the value of the authenticator equal a predetermined value.

2. The method according to claim 1, wherein the recording format comprises a non-rewritable area, and the first value is recorded in the non-rewritable area of the recording medium.

3. An apparatus for recording digital data into a recording medium, the apparatus comprising:

a sync data generator for generating sync data;

a first value generator for generating a first value in synchronization with the sync data;

a content data detector for detecting a portion of content data from a predetermined portion of a data stream in response to the sync data, the portion of content data having a length of a predetermined number of bits;

a second value generator for calculating a second value from the first value generated by the first value generator, the portion of content data detected by the content data detector and an authenticator preset at a predetermined value according to a predetermined formula;

formatting means for receiving the first value from the first value generator, the second value from the second value generator, the sync data from the sync data generator and the content data as the digital data, and formatting the first value, the second value, the sync data and the content data in a recording format by inserting the sync data and the second value into the content data so as to place the second value at a position apart from the sync data by a first distance and to place the portion of the content data at a position apart from the sync data by a second distance and by placing the first value at a predetermined position in the recording format; and data recording means for recording the first value formatted by the formatting means into the recording medium as data that cannot be output as a playback signal from a playback apparatus used for the recording medium, and recording the content data, the sync data and the second value formatted by the formatting means into the recording medium as data that may be output as playback signals from the playback apparatus.

4. A method of playing back digital data of a recording medium by means of a playback apparatus, the method comprising the steps of:

detecting a first value which is recorded into the recording medium as data that cannot be output as a playback signal from the playback apparatus;

detecting sync data, content data and a second value which are recorded into the recording medium as the digital data that may be output as playback signals from the playback apparatus, the second value being placed at a position apart from the sync data by a first distance, a portion of the content data being placed at a position apart from the sync data by a second distance, a value of an authenticator being determined according to a predetermined formula from the first value, the portion of the content data and the second value, and the second value being set so as to have the value of the authenticator equal a predetermined value;

determining a calculated value of the authenticator calculated from the detected first value, the detected second value and the portion of the detected content data;

playing back the detected content data when the calculated value of the authenticator is equal to the predetermined value; and prohibiting the playback apparatus from playing back the content data when the calculated value of the authenticator is not equal to the predetermined value.

5. An apparatus for playing back a recorded signal recorded into a recording medium in a recording format, wherein the recorded signal includes a first value recorded as data that cannot be output as a playback signal and a group of content data, sync data and a second value recorded as data that may be output as a playback signal, wherein the second value is placed at a position apart from the sync data by a first distance, wherein a portion of the content data is placed at a position apart from the sync data by a second distance, wherein a value of an authenticator is determined according to a predetermined formula from the first value, the portion of the content data and the second value, and wherein the second value is set so as to have the value of the authenticator equal a predetermined value, the apparatus comprising:

reading means for reading out the recorded signal from the recording medium;

a first value detector for detecting the first value from the record signal read out by the reading means;

a sync data detector for detecting the sync data from the recorded signal read out by the reading means;

a content data detector for detecting the portion of the content data from the recorded signal read out by the reading means in response to the sync data from the sync data detector;

a second value detector for detecting the second value from the record signal read out by the reading means in response to the sync data from the sync data detector;

a decoder for decoding the content data of the recorded signal read out by the reading means;

an authenticator calculator for calculating a value of an authenticator from the first value detected by the first value detector, the second value detected by the second value detector and the portion of the content data detected by the content data detector; and a controller for outputting the content data decoded by the decoder when the calculated value of the authenticator is equal to the predetermined value, and prohibiting the outputting of the content data when the calculated value of the authenticator is not equal to the predetermined value.

* * * * *